United States Patent
Lee et al.

(10) Patent No.: US 10,784,708 B2
(45) Date of Patent: Sep. 22, 2020

(54) METHOD FOR TRANSMITTING WIRELESS POWER IN WIRELESS CHARGING SYSTEM INCLUDING A WIRELESS POWER TRANSMITTING UNIT AND WIRELESS POWER RECEIVING UNIT

(71) Applicant: Samsung Electronics Co., Ltd., Gyeonggi-do (KR)

(72) Inventors: Kyung-Woo Lee, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/204,363

(22) Filed: Nov. 29, 2018

(65) Prior Publication Data
US 2019/0097451 A1 Mar. 28, 2019

Related U.S. Application Data

(63) Continuation of application No. 15/221,148, filed on Jul. 27, 2016, now Pat. No. 10,170,926.

(30) Foreign Application Priority Data

Jul. 27, 2015 (KR) .................. 10-2015-0106039
Dec. 8, 2015 (KR) .................. 10-2015-0173960

(51) Int. Cl.
*H02J 7/00* (2006.01)
*H02J 7/02* (2016.01)
(Continued)

(52) U.S. Cl.
CPC ........ *H02J 7/025* (2013.01); *H02J 7/007192* (2020.01); *H02J 7/045* (2013.01);
(Continued)

(58) Field of Classification Search
CPC ....................................................... H02J 7/025
(Continued)

(56) References Cited

U.S. PATENT DOCUMENTS

2012/0119914 A1  5/2012  Uchida
2012/0223590 A1  9/2012  Low et al.
(Continued)

FOREIGN PATENT DOCUMENTS

EP   2 782 210      9/2014
JP   2014-212581   11/2014
(Continued)

OTHER PUBLICATIONS

European Search Report dated Jun. 27, 2019 issued in counterpart application No. 19161965.9-1202, 8 pages.
(Continued)

*Primary Examiner* — Edward Tso
*Assistant Examiner* — Ahmed H Omar
(74) *Attorney, Agent, or Firm* — The Farrell Law Firm, P.C.

(57) ABSTRACT

A method for transmitting wireless power in a wireless charging system and a wireless power transmitting unit (PTU) and provided. The method for transmitting wireless power in a wireless charging system includes receiving information related to a voltage from each of a plurality of power receiving units (PRUs); identifying a voltage ratio of each of the plurality of PRUs based on the received information, wherein the voltage ratio is a current voltage relative to a first voltage; determining a PRU among the plurality of PRUs based on the identified voltage ratio; and adjusting transmission power according to a voltage setting value of the determined PRU.

14 Claims, 15 Drawing Sheets

(51) Int. Cl.
    *H02J 50/80*     (2016.01)
    *H02J 50/12*     (2016.01)
    *H02J 7/04*     (2006.01)
    *H04B 5/00*     (2006.01)
    *H02J 50/40*     (2016.01)

(52) U.S. Cl.
    CPC .............. *H02J 50/12* (2016.02); *H02J 50/40* (2016.02); *H02J 50/80* (2016.02); *H04B 5/0031* (2013.01); *H04B 5/0037* (2013.01); *H04B 5/0075* (2013.01)

(58) Field of Classification Search
    USPC ......................................................... 320/108
    See application file for complete search history.

(56) References Cited

U.S. PATENT DOCUMENTS

| | | |
|---|---|---|
| 2013/0099734 A1 | 4/2013 | Lee et al. |
| 2014/0015330 A1* | 1/2014 | Byun ................. H02J 5/005 307/104 |
| 2014/0084856 A1 | 3/2014 | Howard et al. |
| 2014/0125277 A1 | 5/2014 | Van Wiemeersch et al. |
| 2014/0152114 A1 | 6/2014 | Kim et al. |
| 2014/0327393 A1 | 11/2014 | Lee et al. |
| 2015/0042173 A1 | 2/2015 | Lee et al. |
| 2016/0013657 A1 | 1/2016 | Jeong |
| 2016/0079798 A1 | 3/2016 | Jeong |
| 2016/0294220 A1 | 10/2016 | Kwon et al. |
| 2018/0138758 A1* | 5/2018 | Jung .................... H02J 7/0021 |

FOREIGN PATENT DOCUMENTS

| | | |
|---|---|---|
| KR | 10-2013-0045215 | 5/2013 |
| WO | WO 2015/009096 | 1/2015 |
| WO | WO 2015/076561 | 5/2015 |

OTHER PUBLICATIONS

International Search Report dated Oct. 21, 2016 issued in counterpart application No. PCT/KR2016/008205, 9 pages.
European Search Report dated May 4, 2018 issued in counterpart application No. 16830833.6-1202, 8 pages.
Japanese Office Action dated Jul. 20, 2020 issued in counterpart application No. 2018-502109, 11 pages.

* cited by examiner

METHOD FOR TRANSMITTING WIRELESS POWER IN WIRELESS CHARGING SYSTEM INCLUDING A WIRELESS POWER TRANSMITTING UNIT AND WIRELESS POWER RECEIVING UNIT

PRIORITY

This continuation application claims priority under 35 U.S.C. § 120 to U.S. patent application Ser. No. 15/221,148, filed in the United States Patent and Trademark Office on Jul. 27, 2016, which claims priority under 35 U.S.C. § 119(a) to Korean Patent Application Serial Nos. 10-2015-0106039 and 10-2015-0173960, which were filed in the Korean Intellectual Property Office on Jul. 27, 2015 and Dec. 8, 2015, respectively, the entire contents of each application is incorporated herein by reference.

BACKGROUND

1. Field of the Disclosure

The present disclosure relates generally to wireless charging and, more particularly, to a method for transmitting wireless power in a wireless charging system including a wireless power transmitting unit and a wireless power receiving unit.

2. Description of the Related Art

Mobile terminals such as a mobile phone, a personal digital assistant (PDA) and the like are configured for use with rechargeable batteries due to their nature, and the battery of the mobile terminal is charged through supplied electronic energy by using a separate charging apparatus. Typically, the charging device and the battery have separate contact terminals at an exterior thereof and are electrically connected to each other by contact between the contact terminals.

However, in such a contact-type charging scheme, the contact terminals protrude outwardly, and thus are easily contaminated by foreign substances or exposed to moisture. As a result, battery charging may not be performed correctly.

Recently, wireless charging or non-contact charging technology has been developed and used for electronic devices, e.g., a mobile phone, to solve the above-mentioned problem.

The wireless charging technology uses wireless power transmission and reception which allows a battery to be automatically charged if the battery is positioned on a charging pad, i.e., without connecting a mobile phone which includes the battery to a separate charging connector. The wireless charging technology can improve the portability of the electronic devices because it does not require a wired charger.

The wireless charging technology can include an electromagnetic induction scheme which uses a coil, a resonance scheme which uses resonance, and an RF/microwave radiation scheme which converts electrical energy to a microwave energy and then transmits the microwave energy.

It is considered up to now that the electromagnetic induction scheme is mainstream.

A power transmission method through the electromagnetic induction includes transmitting electric power between a first coil and a second coil. When a magnet is moved in a coil, an induction current occurs. By using the induction current, a magnetic field is generated at a transmitting end, and an electric current is induced according to a change in the magnetic field so as to generate energy at a receiving end. The phenomenon is referred to as magnetic induction, and the power transmission method using magnetic induction has high energy transmission efficiency.

The resonance scheme includes a system in which electricity is wirelessly transferred using an electric power transmission principle of the resonance scheme based on a coupled mode theory. It is known that the resonant electrical energy does not affect surrounding machines or human bodies differently from other electromagnetic waves because the resonant electrical energy is directly transferred only to a device having a resonance frequency and unused parts are reabsorbed into an electromagnetic field instead of spreading into the air.

In order to sense a state where a wireless power receiving unit (PRU) is located on a wireless power transmitting unit (PTU), a method for detecting a change in the impedance of a power transmitter can be provided.

When the PTU detects the presence of a PRU through the detection of impedance change, the PTU may initiate communication with the PRU by supplying enough power to communicate with the PRU.

On the other hand, in a multi-charging state where one PTU charges a plurality of PRU, when a charging voltage for one PRU is excessively high or an exothermic reaction occurs, the PTU or PRU may experience a failure or may not charge normally.

SUMMARY

An aspect of the present disclosure provides a method for transmitting wireless power in a wireless charging system, a wireless power transmitting unit, and a PRU, which can efficiently control charging for a plurality of PRUs by setting a dominant PRU in consideration of a heat generation rate of each PRU in a multi-charge situation where one PTU charges the plurality of PRUs.

An aspect of the present disclosure provides a method for transmitting wireless power in a wireless charging system, a wireless power transmitting unit, and a PRU, which can efficiently control charging for a plurality of PRUs by setting a dominant PRU in consideration of a charging voltage rate of each PRU in a multi-charge situation where one PTU charges the plurality of PRUs.

In accordance with an aspect of the present disclosure there is provided a method for transmitting wireless power in a wireless charging system. The method includes receiving information related to a voltage from each of a plurality of PRUs; identifying a voltage ratio of each of the plurality of PRUs based on the received information, wherein the voltage ratio is a current voltage relative to a first voltage; determining a PRU among the plurality of PRUs based on the identified voltage ratio; and adjusting transmission power according to a voltage setting value of the determined PRU.

In accordance with an aspect of the present disclosure there is provided a wireless PTU. The wireless PTU includes a communication unit configured to receive information related to a voltage from each of a plurality of PRUs; a processor configured to identify a voltage ratio of each of the plurality of PRUs based on the received information, and determine a PRU among the plurality of PRUs based on the identified voltage ratio, wherein the voltage ratio is a current voltage relative to a first voltage; and a power transmitter configured to transmit power to the plurality of PRUs based on a voltage setting value of the determined PRU.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
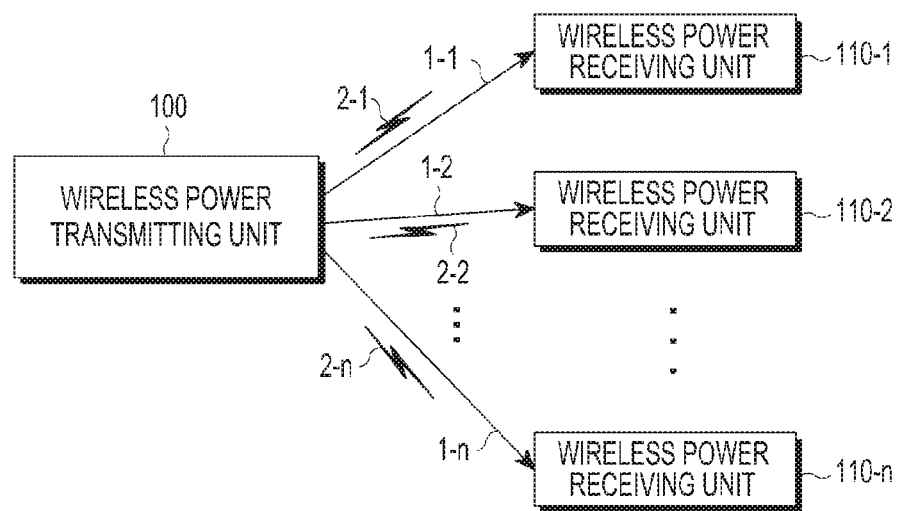
FIG. 1 is a diagram of a wireless charging system, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

FIG. 1 is a diagram of a wireless charging system, according to an embodiment of the present disclosure. As shown in FIG. 1A, a wireless charging system includes a PTU 100 and one or more PRUs 110-1, 110-2, . . . , and 110-n.

The PTU 100 wirelessly transmits electric power 1-1, 1-2, . . . , and 1-n to the one or more PRUs 110-1, 110-2, . . . , and 110-n, respectively. Particularly, the PTU 100 may wirelessly transmit electric power 1-1, 1-2, . . . , and 1-n to only a PRU which is authenticated through a predetermined authentication procedure.

The PTU 100 may achieve an electrical connection with the PRUs 110-1, 110-2, . . . , and 110-n. For example, the PTU 100 may transmit wireless electric power in the form of electromagnetic waves to the wireless power receiving 110-1, 110-2, . . . , and 110-n.

Meanwhile, the PTU 100 may perform bidirectional communication with the PRUs 110-1, 110-2, . . . , and 110-n. Here, the PTU 100 and the PRUs 110-1, 110-2, . . . , and 110-n may process packets 2-1, 2-2, . . . , 2-n including a predetermined number of frames, or transmit and receive the packets. The frames will be described below in more detail below. The PRU may be implemented, for example, in a mobile communication terminal, a PDA, a portable multimedia player (PMP), a smartphone, and the like.

The PTU 100 may transmit electric power to the plurality of PRUs 110-1, 110-2, . . . , and 110-n through a resonant scheme. When the PTU 100 adopts the resonant scheme, the distance between the PTU 100 and the plurality of PRUs 110-1, 110-2, . . . , and 110-n is less than or equal to 30 m. Further, when the PTU 100 adopts the electromagnetic induction scheme, the distance between the PTU 100 and the plurality of PRUs 110-1, 110-2, . . . , and 110-n is less than or equal to 10 cm.

The PRUs 110-1, 110-2, . . . , and 110-n may receive wireless electric power from the PTU 100 to charge batteries provided in the PRUs 110-1, 110-2, . . . , and 110-n. Further, the PRUs 110-1, 110-2, . . . , and 110-n may transmit a signal of requesting a wireless power transmission, information necessary for a reception of wireless electric power, information on a status of the PRUs, and/or information on a control of the PTU 100 to the PTU 100. Information on the transmitted signal will be described below in more detail below.

Further, the PRUs 110-1, 110-2, . . . , and 110-n may transmit a message indicating a charging state of each of the PRUs 110-1, 110-2, . . . , and 110-n to the PTU 100.

The PTU 100 may include a display device such as a display, and display a state of each of the PRUs 110-1, 110-2, and 110-n based on the message received from each of the PRUs 110-1, 110-2, . . . , and 110-n. Also, the PTU 100 may display an expected time period until the charging of each of the PRUs 110-1, 110-2 and 110-n is completed, together with the state of each of the PRUs 110-1, 110-2 and 110-n.

The PTU 100 may transmit a control signal for disabling a wireless charging function to each of the PRUs 110-1, 110-2, . . . , and 110-n. The PRUs having received the disable control signal of the wireless charging function from the PTU 100 may disable the wireless charging function.

Figure 2:
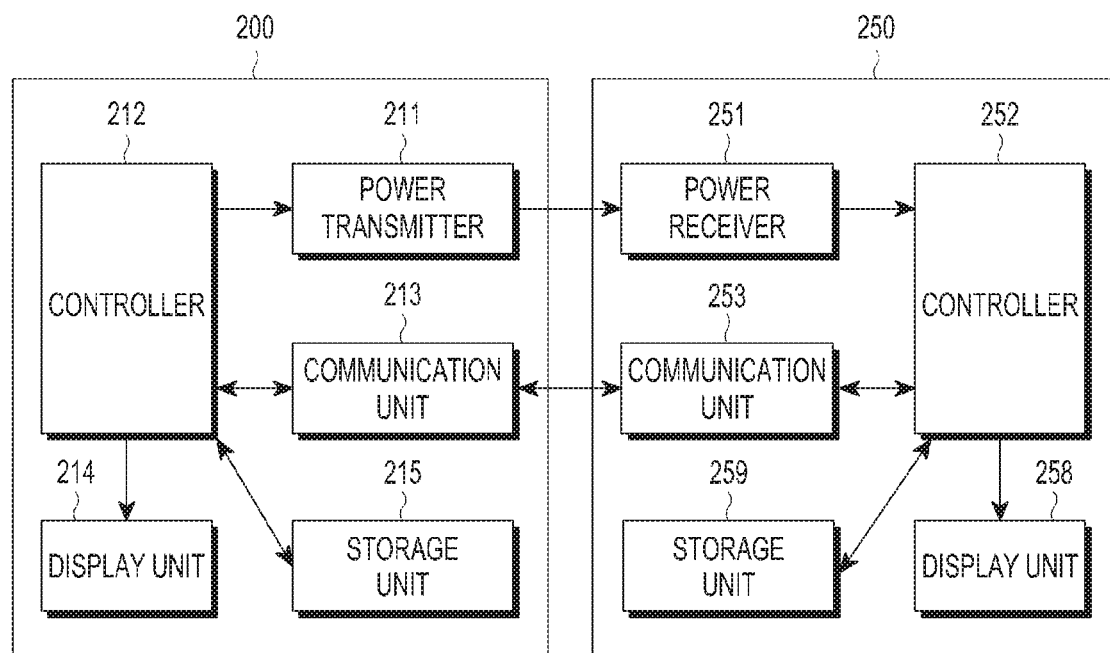
FIG. 2 is a diagram of a PTU and a PRU, according to an embodiment of the present disclosure.

FIG. 2 is a diagram of a PTU and a PRU, according to an embodiment of the present disclosure.

As illustrated in FIG. 2, the PTU 200 may include a power transmitter 211, a controller (or processor) 212, a communication unit 213, a display unit 214, and a storage unit 215.

The power transmitter 211 provides power that is required by the PTU 200, and wirelessly provide power to the PRU 250. The power transmitter 211 may supply power in an alternating current (AC) waveform type, or may convert power in a direct current (DC) waveform type to the power in the AC waveform type by using an inverter and supplying the power in the AC waveform type. The power transmitter 211 may be implemented in the form of an embedded battery or in the form of a power reception interface so as to receive the power from outside and supply the power to other elements.

The controller 212 controls the overall operations of the PTU 200 by using an algorithm, a program, or an application that is required for a control, which is read from a storage unit 215. The controller 212 may be implemented in a form of a central processing unit (CPU), a microprocessor, or a mini computer.

The communication unit 213 communicates with the PRU 250, and may receive power information from the PRU 250. Here, the power information may include at least one of a capacity of the PRU 250, a residual amount of the battery, a number of charging times, an amount of use, a battery capacity, and a proportion of the battery.

Further, the communication unit 213 transmits a signal of controlling a charging function in order to control the charging function of the PRU 250. The signal of controlling the charging function may be a control signal of controlling the power receiver 251 of the specific PRU 250 so as to make the charging function to be enabled or disabled. More specifically, the power information may include information on an insertion of a wire charging terminal, a transition from a stand-alone (SA) mode to a non-SA (NSA) mode, error state release and the like.

In addition, the charging function control signal may include information associated with power adjustment or a power control command to address the occurrence of an abnormal situation according to various embodiments of the present disclosure.

The communication unit 213 receives a signal from another wireless power transmitter as well as the PRU 250. For example, the communication unit 213 may proceed with a registration procedure for wireless charging by receiving an advertisement signal transmitted from a communication unit 253 of the PRU 250.

The controller 212 displays a state of the PRU 250 on the display unit 214 based on the message received from the PRU 250 through the communication unit 213. Further, the controller 212 may display, on the display 214, an expected time period until the charging of the PRU 250 is completed.

Furthermore, as illustrated in FIG. 2, the PRU 250 may include at least one of the power receiver 251, the controller 252, the communication unit 253, a display unit 258, and a storage unit 259.

The power receiver 251 may wirelessly receive power transmitted from the PTU 200. Here, the power receiving unit 251 may receive power in an AC waveform.

The controller (or processor) 252 may control the overall operations of the PRU 250 by using an algorithm, a program, or an application required for a control, which is read from a storage unit. The controller 252 may be implemented in a form of a central processing unit (CPU), a microprocessor, or a mini computer.

The communication unit 253 communicates with the PTU 200 through a predetermined scheme. The communication unit 253 may transmit power information to the PTU 200. Here, the power information may include at least one of a capacity of the PRU 250, a residual amount of the battery, a number of charging times, an amount of use, a battery capacity, and a proportion of the battery.

Further, the communication unit 253 may transmit a signal for controlling a charging function in order to control the charging function of the PRU 250. The signal for controlling the charging function may be a control signal for controlling the power receiver 251 of the specific PRU 250 so as to enable or disable the charging function. More specifically, the power information may include information on an insertion of a wire charging terminal, a transition from a SA mode to a NSA mode, error state release and the like. In addition, the charging function control signal may include information associated with power adjustment or a power control command to address the occurrence of an abnormal situation.

In addition, the communication unit 253 may proceed with the registration procedure for wireless charging by receiving a beacon signal transmitted from the power transmitter 211 of the PTU 200 through the power receiver 251, and then transmitting an advertisement signal to the PTU 200 within a predetermined time.

The controller 252 may control a state of the PRU 250 to be displayed on the display unit 258. Further, the controller 252 may also display, on the display unit 258, an expected time period until the PRU 250 is completely charged.

Figure 3:
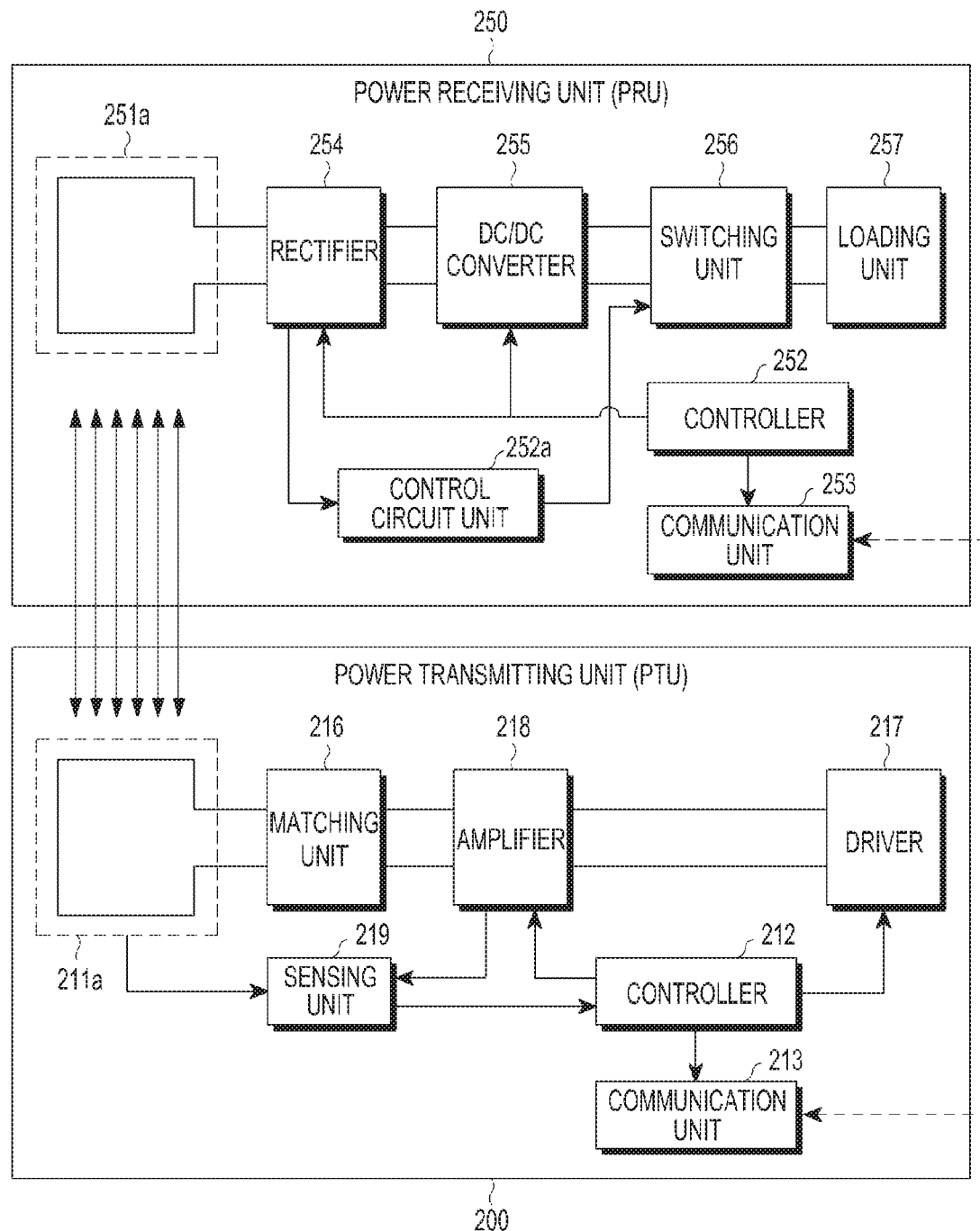
FIG. 3 is a diagram of the PTU and the PRU, according to the embodiment of the present disclosure.

FIG. 3 is a diagram of a PTU and a PRU, according to the embodiment of the present disclosure.

As shown in FIG. 3, the PTU 200 includes at least one of a transmitting side resonator (Tx resonator) 211a, the controller 212 (for example, an MCU (Microcontroller), the communication unit 213 (for example, an out-of-band signaling unit), a matching unit 216, a driver 217, an amplifier (power amp) 218, or a sensing unit 219. The PRU 250 may include at least one of a receiving side resonator (Rx resonator) 251a, the controller 252, a control circuit unit 252a, the communication unit 253, a rectifier 254, a DC/DC converter 255, a switching unit 256, or loading unit (client device load) 257.

The driver 217 outputs DC power having a preset voltage value. The voltage value of the DC power output from the driver 217 may be controlled by the controller 212.

The DC power output from the driver 217 may be output to the amplifier 218. The amplifier 218 may amplify the DC power by a preset gain. Further, the DC power may be converted into AC power based on a signal input from the controller 212. Accordingly, the amplifier 218 may output AC power.

The matching circuit 216 performs impedance matching. For example, the output power may be controlled to have high efficiency or high capacity by adjusting the impedance viewed from the matching circuit 216. The sensing unit 219 may sense a load change caused by the PRU 250 through the Tx resonator 211a or the amplifier 218. The sensing result of the sensing unit 219 may be provided in the controller 212.

When the PTU 200 transmits a short beacon signal or a long beacon signal to the PRU 250, the PRU 250 may generate a load change by a pre-set circuit or the like. The sensing unit 219 of the PTU 200 may detect the load change in the PRU 250, and may provide a result of detecting the load change to the controller 212. The controller 212 may detect the presence of PRU 250 based on the load change detected by the sensing unit 219, or may extend or adjust the transmission period of the beacon signal (e.g., long beacon signal).

The matching circuit 216 may adjust the impedance based on a control of the controller 212. The matching unit 216 may include at least one of a coil and a capacitor. The controller 212 may control a connection state with at least one of the coil and the capacitor and may, accordingly, perform the impedance matching.

The Tx resonator 211a may transmit the input AC power to the Rx resonator 251a. The Tx resonator 211a and the Rx resonator 251a may be implemented in a resonant circuit having the same resonance frequency. For example, the resonance frequency may be determined as 6.78 MHz.

Meanwhile, the communication unit 213 may communicate with the communication unit 253 of the PRU 250, and perform communication (wireless-fidelity (Wi-Fi™), ZigBee™, or Bluetooth™ (BT)/Bluetooth low energy (BLE)) with, for example, a bi-directional 2.4 GHz frequency.

The Rx resonator 251a may receive power for charging. In addition, the Rx resonator 251a may receive the beacon signal (e.g., short beacon signal or long beacon signal, etc.) transmitted through the Tx resonator 211a of the PTU 200.

The rectifier 254 may rectify wireless power received by the Rx resonator 251a in the DC form, and may be implemented in, for example, the form of a bridge diode. The DC/DC converter 255 may convert the rectified electric current into a predetermined gain. For example, the DC/DC converter 255 may convert the rectified power in such a manner that the output side thereof has a voltage of 5V. On the other hand, the minimum and maximum values of a voltage, which can be applied to a front end of the DC/DC converter 255, may be set in advance.

The switch 256 connects the DC/DC converter 255 to the loading unit 257. The switch 256 is held in an on/off state under a control of the controller 252. In some embodiments, the switch 256 may be omitted. In a case where the switch 256 is in the on state, the loading unit 257 may store converted electric power which is input from the DC/DC converter 255.

The control circuit unit 252a may generate a control signal for controlling the switch unit 256 by a signal received through the Rx resonator 251a of the PRU 250. For example, the control circuit unit 252a, separate from the controller 252, is driven by the signal (for example, the short beacon signal or the long beacon signal) received by the PRU 250 so as to control the switch 256 to generate the load change. The control circuit unit 252a can also generate the load change in the PRU 250 when power is not supplied to the controller 252 or without the operation of the controller 252.

Further, the control circuit unit 252a may generate a code or a signal having a predetermined pattern by the signal (e.g., the short beacon signal or long beacon signal) received through the Rx resonator 251a of the PRU 250. The control circuit unit 252a may control the switch 256 by the generated code or signal, and accordingly generate a load change corresponding to the predetermined code or signal. The PTU 200 may acquire predetermined information (for example, information related to extension of the period of the beacon signal, etc.) by detecting the load change of the wireless power receiver 250 and decoding the predetermined code or signal.

Figure 4:
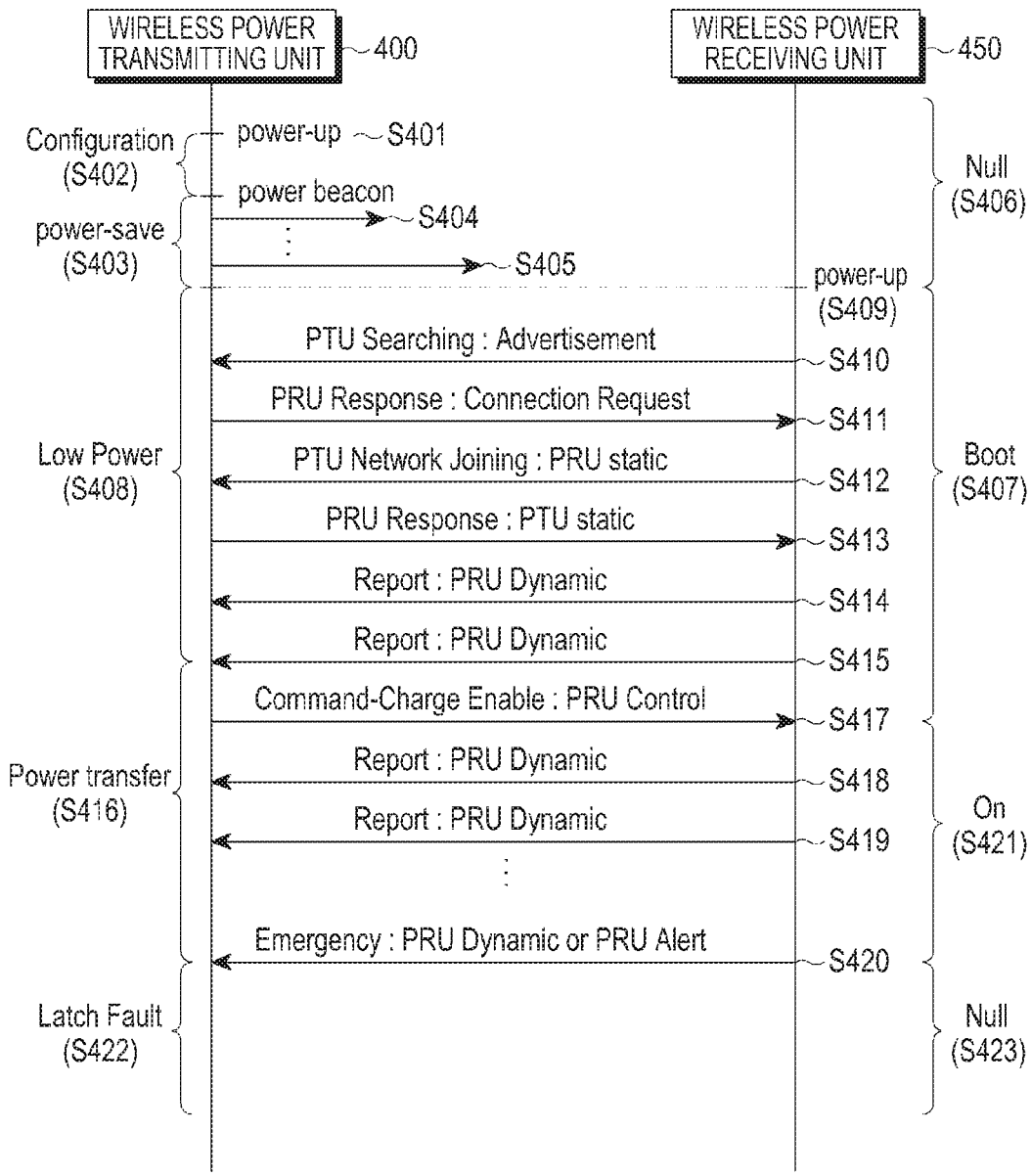
FIG. 4 is a signaling diagram of the PTU and the PRU, according to an embodiment of the present disclosure.

FIG. 4 is a signaling diagram of a PTU and a PRU, according to an embodiment of the present disclosure. As shown in FIG. 4, a PTU 400 may apply electric power in step S401. When the power is applied, the PTU 400 may configure an environment in step S402.

The PTU 400 may enter a power saving mode in step S403. In the power saving mode, the PTU 400 may apply different power beacons for detection in their own cycles, a detailed description thereof will be made with reference to FIG. 6. For example, as illustrated in FIG. 4, the PTU 400 may apply power beacons for detection (e.g., the short beacon signal or long beacon signal) in steps S404 and S405, and the power beacons for detection may be different from each other in terms of the power value. A part or all of the detection power beacons may have enough power to drive the communication unit of the PRU 450. For example, the PRU 450 may drive the communication unit by the part or all of the detection power beacons to communicate with the PTU 400. Here, the above state may be named a null state, which is indicated at step 406.

The PTU 400 may detect a load change by an arrangement of the PRU 450. The PTU 400 may enter a low power mode in step S408. The low power mode will also be described in more detail with reference to FIG. 6. Meanwhile, the PRU 450 may drive the communication unit based on power received from the PTU 400 in step S409.

The wireless power receiver 450 may transmit a PTU searching signal to the PTU 400 in step S410. The PRU 450 may transmit the PTU searching signal as an advertisement (AD) signal using BLE. The PRU 450 may transmit the PTU searching signal periodically or until a preset time arrives and may receive a response signal from the PTU 400.

When receiving the PTU searching signal from the PRU 450, the PTU 400 may transmit a PRU response signal in step S411. Here, the PRU response signal may establish a connection between the PTU 400 and the PRU 450.

The PRU 450 may transmit a PRU static signal in step S412. Here, the PRU static signal may be a signal indicating a state of the PRU 450, and may be used to request subscription to a wireless power network managed by the PTU 400.

The PTU 400 may transmit a PTU static signal in step S413. The PTU static signal transmitted by the PTU 400 may be a signal indicating capability of the PTU 400.

When the PTU 400 and PRU 450 transmit and receive the PRU static signal and PTU static signal, the PRU 450 may periodically transmit a PRU dynamic signal, in steps S414 and S415. The PRU dynamic signal may include information on at least one parameter measured by the PRU 450. For example, the PRU dynamic signal may include information on a voltage at a back end of the rectifier of the PRU 450. The status of the PRU 450 may be referred to as a boot status, which is referenced by S407.

The PTU 400 may enter a power transmission mode in step S416, and the PTU 400 may transmit a PRU control signal that is a command signal which enables the PRU 450 to perform the charging in step S417. In the power transmission mode, the PTU 400 may transmit charging power.

The PRU control signal transmitted by the PTU 400 may include information enabling/disabling the charging of the PRU 450 and permission information. The PRU control signal may be transmitted whenever a charging state is changed. The PRU control signal may be transmitted, for example, every 250 ms, or transmitted when a parameter is changed. The PRU control signal may be set to be transmitted within a preset threshold, for example, within one second even though the parameter is not changed.

The PRU 450 may change a configuration according to the PRU control signal and transmit the PRU dynamic signal for reporting the state of the PRU 450 in steps S418 and S419. The PRU dynamic signal transmitted by the PRU 450 may include at least one of voltage information, current information, information on a state of the PRU, and temperature information. The state of the PRU 450 may be called an on state, which is referenced by S421.

Meanwhile, the PRU dynamic signal may have a data structure as indicated in Table 1.

TABLE 1

| Field | Octets | Description | Use | Units |
|---|---|---|---|---|
| Optional fields validity | 1 | Defines which optional fields are populated | Mandatory | |

TABLE 1-continued

| Field | Octets | Description | Use | Units |
|---|---|---|---|---|
| $V_{RECT}$ | 2 | Voltage at diode output | Mandatory | mV |
| $I_{RECT}$ | 2 | Current at diode output | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Degrees Celsius (from −40° C.) |
| $V_{RECT\_MIN\_DYN}$ | 2 | $V_{RECT\_LOW\_LIMIT}$ (dynamic value) | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | $V_{RECT\_HIGH\_LIMIT}$ (dynamic value) | Optional | mV |
| PRU alert | 1 | Warnings | Mandatory | Bit field |
| RFU | 3 | Undefined | | |

As shown in Table 1, the PRU dynamic signal may include one or more fields that may be configured to include optional field information, information on a voltage at the back end of the rectifier of the PRU, information on current at the back end of the rectifier of the PRU, information on a voltage at the back end of the DC/DC converter of the PRU, information on current at the back end of the DC/DC converter of the PRU, temperature information, information on the minimum voltage value ($V_{RECT\_MIN\_DYN}$) at the back end of the rectifier of the PRU, information on an optimum voltage value ($V_{RECT\_SET\_DYN}$) at the back end of the rectifier of the PRU, maximum voltage value ($V_{RECT\_HIGH\_DYN}$) information of the back end of the rectifier of the PRU, and warning information (PRU alert). The PRU dynamic signal may include at least one of the above fields.

For example, one or more voltage setting values (for example, the minimum voltage value information ($V_{RECT\_MIN\_DYN}$) of the back end of the rectifier of the PRU, the optimal voltage value information ($V_{RECT\_SET\_DYN}$) of the back end of the rectifier of the PRU, and the maximum voltage value ($V_{RECT\_HIGH\_DYN}$) information of the back end of the rectifier of the PRU) determined according to a charging state may be inserted into corresponding fields of the PRU dynamic signal and then transmitted. As such, the PTU that has received the PRU dynamic signal may adjust a wireless charging voltage to be transmitted to each PRU, with reference to the voltage setting values included in the PRU dynamic signal.

The alert information (PRU Alert) may have a data structure shown in Table 2 below.

TABLE 2

| 7 | 6 | 5 | 4 | 3 | 2 | 1 | 0 |
|---|---|---|---|---|---|---|---|
| Over-voltage | Over-current | Over-temp | Charge Complete | TA detect | Transition | restart request | RFU |

Referring to Table 2, the alert information (PRU Alert) may include a bit for a restart request, a bit for a transition, and a bit for detecting an insertion of a travel adapter (TA detect). The TA detect indicates a bit informing of a connection between the PTU providing wireless charging and a terminal for wired charging by the PRU. The bit for the transition indicates a bit informing the PTU that the PRU is reset before a communication integrated circuit (IC) of the PRU is switched from a SA mode to a NSA mode. The restart request indicates a bit informing the PRU that the PTU is ready to restart the charging when the charging is disconnected since the PTU reduces power due to the generation of an over current state or an over temperature state and then the state is returned to the original state.

Further, the alert information (PRU Alert) may also have a data structure shown in Table 3 below.

TABLE 3

| 7 | 6 | 5 | 4 | 3 | 2 | 1 | 0 |
|---|---|---|---|---|---|---|---|
| PRU Over-Voltage | PRU Over-Current | PRU Over-Temperature | PRU Self Protection | Charge Complete | Wired Charger Detect | Mode Transition Bit 1 | Mode Transition Bit 0 |

Referring to Table 3 above, the alert information may include over voltage, over current, over temperature, PRU self-protection, charge compete, wired charger detect, mode transition and the like. When the over voltage field is set as "1", it may indicate that a voltage Vrect of the PRU exceeds a limit of the over voltage. Further, the over current and the over temperature may be set in the same way as the over voltage. In addition, the PRU self-protection indicates that the PRU directly reduces a load of power and thus protects itself. In this event, the PTU is not required to change a charging state.

Bits for a mode transition may be set as a value informing the PTU of a period during which a mode transition process is performed. The bits indicating the mode transition period may be expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4 above, "00" indicates that there is no mode transition, "01" indicates that a time required for completing the mode transition is a maximum of two seconds, "10" indicates that a time required for completing the mode transition is a maximum of three seconds, and "11" indicates that a time required for completing the mode transition is a maximum of six seconds.

For example, when three seconds or less are spent for completing the mode transition, the mode transition bit may be set as "10". Prior to starting the mode transition process, the PRU may make a restriction such that there is no change in impedance during the mode transition process by changing an input impedance setting to match 1.1 W power draw. Accordingly, the PTU may adjust power ($I_{TX\_COIL}$) for the PRU in accordance with the setting, and accordingly, maintain the power ($I_{TX\_COIL}$) for the PRU during the mode transition period.

Accordingly, when the mode transition period is set by the mode transition bit, the PTU may maintain the power ($I_{TX\_COIL}$) for the PRU during the mode transition time, for example, three seconds. That is, the PTU may maintain a connection even though a response is not received from the PRU for three seconds. However, after the mode transition time passes, the PRU may be considered as a rogue object and thus power transmission may be terminated.

Meanwhile, the PRU 450 may detect the generation of errors. The PRU 450 may transmit an alert signal to the PTU 200 in step S420. The alert signal may be transmitted in the form of the PRU dynamic signal or a PRU alert signal. For example, the PRU 450 may transmit the PRU alert field of Table 1 reflecting an error state to the PTU 400. Alternatively, the PRU 450 may transmit a single alert signal indicating the error state to the PTU 400. When receiving the alert signal, the PTU 400 may enter a latch fault mode in step S422. The PRU 450 may enter a null state in step S423.

Figure 5:
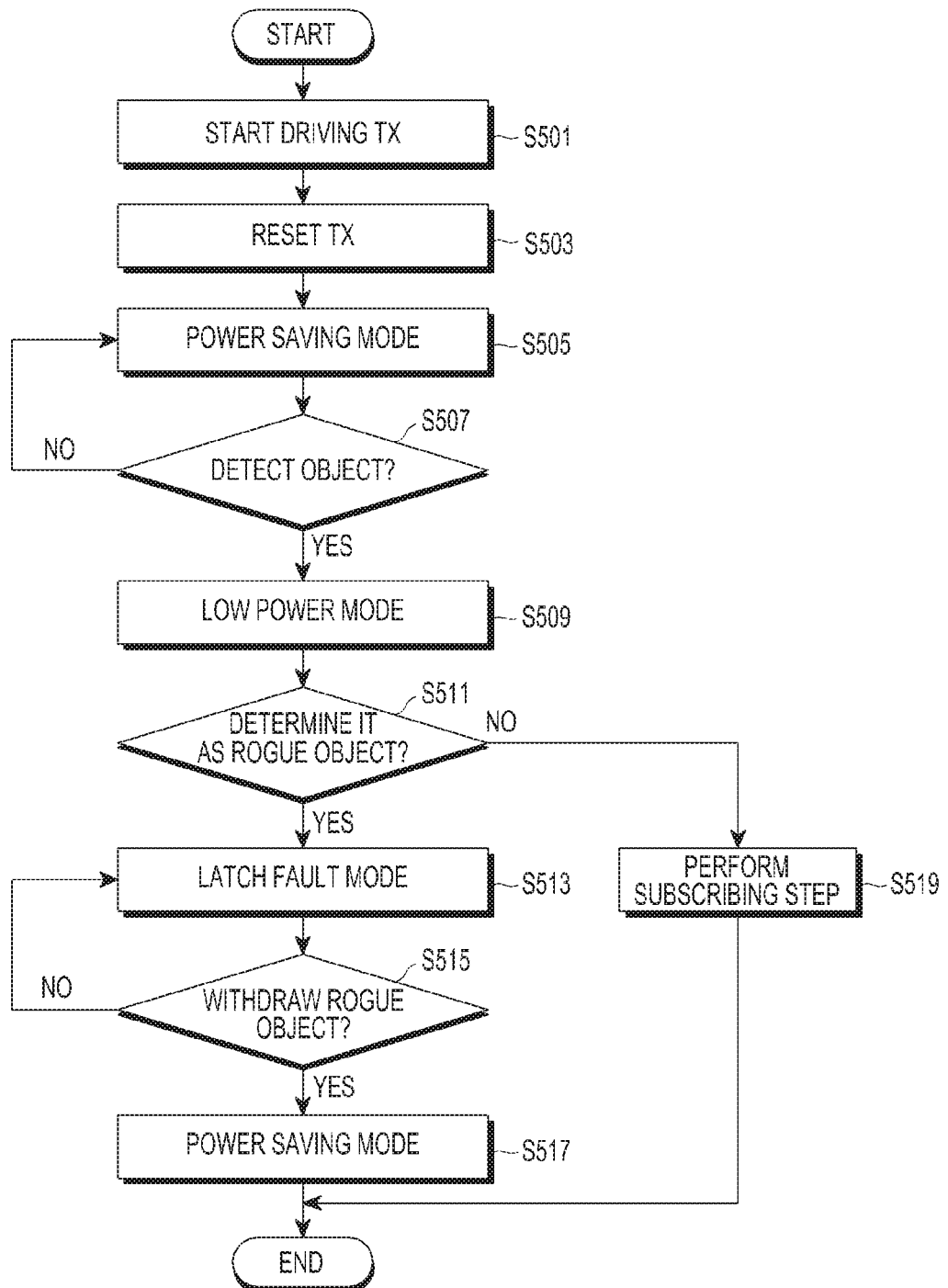
FIG. 5 is a flowchart of a method for operating the PTU and the PRU, according to an embodiment of the present disclosure.
Figure 6:
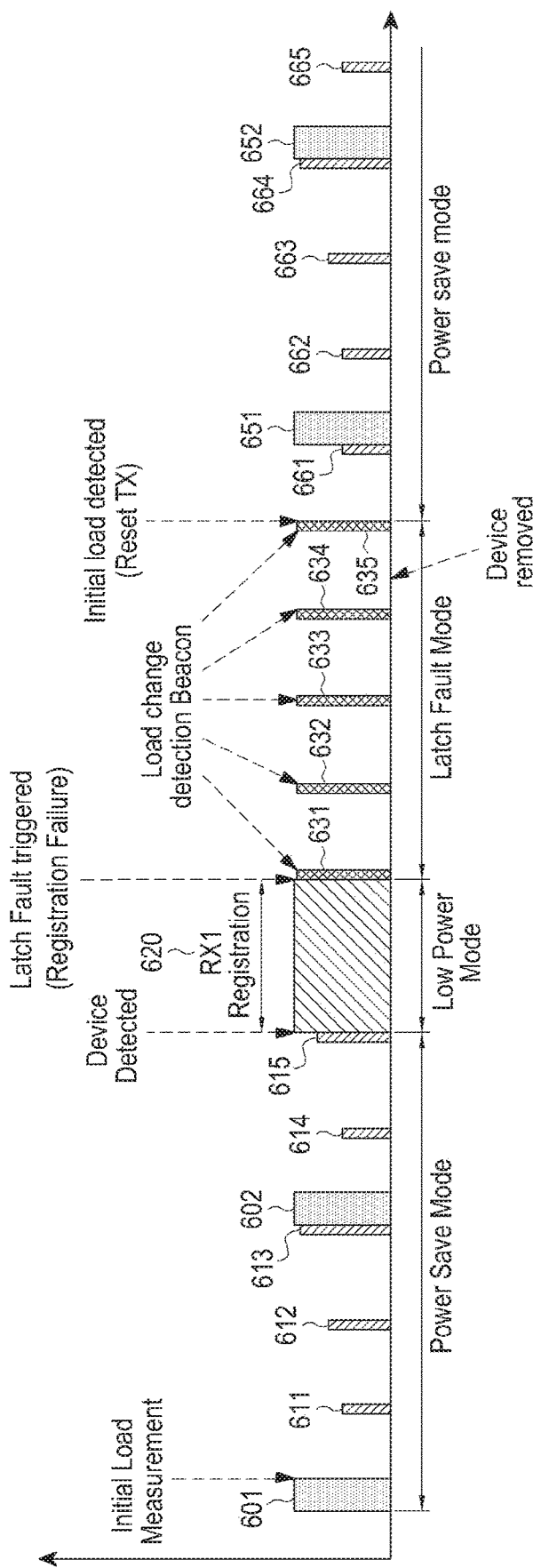
FIG. 6 is a graph on a time axis of an amount of power applied by a wireless power transmitting unit, according to an embodiment of the present disclosure.

FIG. 5 is a flowchart of a method for operating a PTU and a PRU, according to an embodiment of the present disclosure. The process of FIG. 5 will be described in more detail with reference to FIG. 6 below. FIG. 6 is a graph on a time axis (x axis) of an amount of power applied by a PTU of FIG. 5, according to an embodiment of present disclosure.

As illustrated in FIG. 5, the PTU may initiate the method in step S501. Further, the PTU may reset an initial configuration in step S503. The PTU may enter a power saving mode in step S505. Here, the power saving mode may be an interval where the PTU applies power having different amounts to the power transmitter. For example, the power saving mode may correspond to an interval where the PTU applies second detection power 601 and 602 and third detection power 611, 612, 613, 614, and 615 to the power transmitter in FIG. 6. Here, the PTU may periodically apply the second detection power 601 and 602 by second period. When the PTU applies the second detection power 601 and 602, the application may continue for a second term. The PTU may periodically apply the third detection power 611, 612, 613, 614, and 615 by third period. When the PTU applies the third detection power 611, 612, 613, 614, and 615, the application may continue for a third term. Meanwhile, although it is illustrated that power values of the third detection power 611, 612, 613, 614, and 615 are different from each other, the power values of the third detection power 611, 612, 613, 614, and 615 may be different or they may be the same.

The PTU may output the third detection power 611 and then output the third detection power 612 having the same size of the power amount. As described above, when the PTU outputs the third detection power having the same magnitude, the power amount of the third detection power may be a sufficient amount to detect a minimal sized PRU, e.g., a PRU of a category (a type of PRU) 1.

On the other hand, the PTU may output the third detection power 611 and then output the third detection power 612 having a different size of the power amount. When the PTU outputs the third detection power having the different amount as described above, the amount of the third detection power may be a sufficient amount to detect a PRU of categories 1 to 5. For example, when the third detection power 611 may have a power amount by which a PRU of category 5 can be detected, the third detection power 612 may have a power amount by which a PRU of category 3 can be detected, and the third detection power 613 may have a power amount by which a PRU of category 1 can be detected.

Meanwhile, the second detection power 601 and 602 may be power that can drive the PRU. More specifically, the second detection power 601 and 602 may have a power amount that can drive the controller and the communication unit of the PRU.

The PTU applies the second detection power 601 and 602 and the third detection power 611, 612, 613, 614, and 615 to the power receiver by a second period and a third period, respectively. When the PRU is disposed on the wireless power transmitting unit, impedance at a point of the PTU may be changed. For example, the PTU may detect a change in impedance while the second detection power 601 and 602 and third detection power 611, 612, 613, 614, and 615 are applied. For example, the PTU may detect the impedance change while the third detection power 615 is applied. Accordingly, the PTU may detect an object in step S507. When the object is not detected (No in step S507), the PTU may maintain a power saving mode in which different power is periodically applied, in step S505.

Meanwhile, when there is the change in the impedance and thus the object is detected (Yes in step S507), the PTU may enter a low power mode. Here, the low power mode is a mode in which the PTU applies driving power having a power amount by which the controller and the communication unit of the PRU can be driven. For example, in FIG. 6, the PTU may apply driving power 620 to the power transmitter. The PRU may receive the driving power 620 to drive the controller and/or the communication unit. The PRU may perform communication with the PTU according to a predetermined scheme based on the driving power 620. For example, the PRU may transmit/receive data required for authentication, and may subscribe to the wireless power network, which the PTU manages, on the basis of the transmission/reception of the data. However, when a rogue object is arranged instead of the PRU, the data transmission/reception cannot be performed. Accordingly, the PTU may determine whether the arranged object is the rogue object in step S511. For example, when the PTU does not receive a response from the object within a preset time, the PTU may determine the object as the rogue object.

If it is determined that the object is the rogue object (Yes in step S511), the PTU may enter the latch fault mode in step S513. If it is determined that the object is not the rogue object (No in step S511), however, an entering or subscribing step may be performed in step S519. For example, the PTU may periodically apply first power 631 to 634 by a first period in FIG. 6. The PTU may detect a change in impedance while applying the first power. For example, when the rogue object is withdrawn (Yes in step S515), the change in the impedance may be detected and the PTU may determine that the rogue object is withdrawn. Alternatively, when the rogue object is not withdrawn (No in step S515), the PTU may not detect the change in the impedance. When the rogue object is not withdrawn, the PTU may output at least one of a lamp (or other visual indication) and a warning sound to inform a user that a state of the PTU is an error state. Accordingly, the PTU may include an output unit that outputs at least one of the lamp and the warning sound.

When it is determined that the rogue object is not withdrawn (No in step S515), the wireless power transmitter may maintain the latch fault mode in step S513. On the other hand, when it is determined that the object is withdrawn (Yes in step S515), the PTU may enter the power saving mode again in step S517. For example, the PTU may apply second power 651 to 652 and third power 661 and 665 of FIG. 6.

As described above, when the rogue object is arranged instead of the PRU, the PTU may enter the latch fault mode. In addition, the PTU may determine whether the rogue object is withdrawn, according to the change in the impedance based on the power applied in the latch fault mode. That is, a condition of the entrance into the latch fault mode in the embodiment of FIGS. 5 and 6 may be caused by the rogue object. Meanwhile, the PTU may have various latch fault mode entrance conditions as well as the arrangement of the rogue object. For example, the PTU may be cross-connected with the arranged PRU and may enter the latch fault mode in the above case.

Accordingly, when the cross-connection is generated, the PTU may be required to return to an initial state and the PRU may be withdrawn. The PTU may set the cross-connection, in which the PRU arranged on another PTU enters the wireless power network, as a condition of entry into the latch fault mode. An operation of the PTU when the error is generated, which includes the cross-connection, will be described with reference to FIG. 7.

Figure 7:
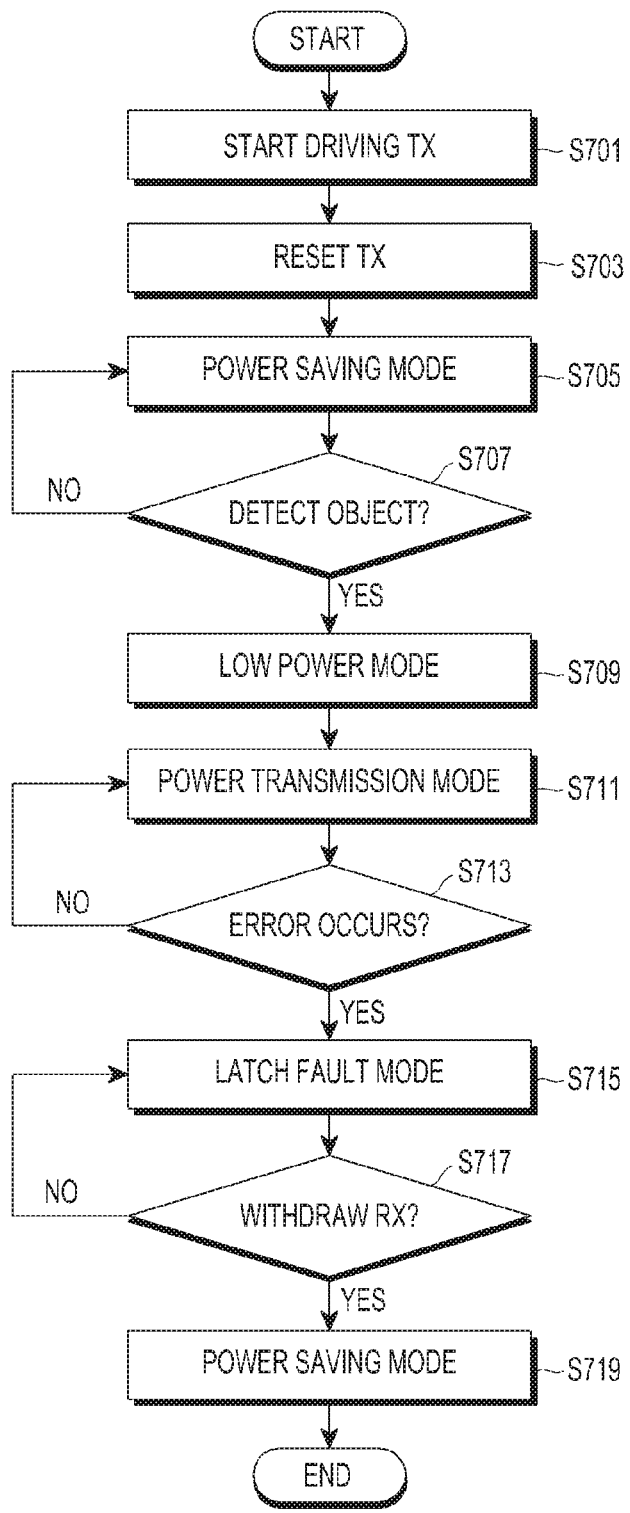
FIG. 7 is a flowchart of a control method of the wireless power transmitting unit, according to an embodiment of the present disclosure.
Figure 8:
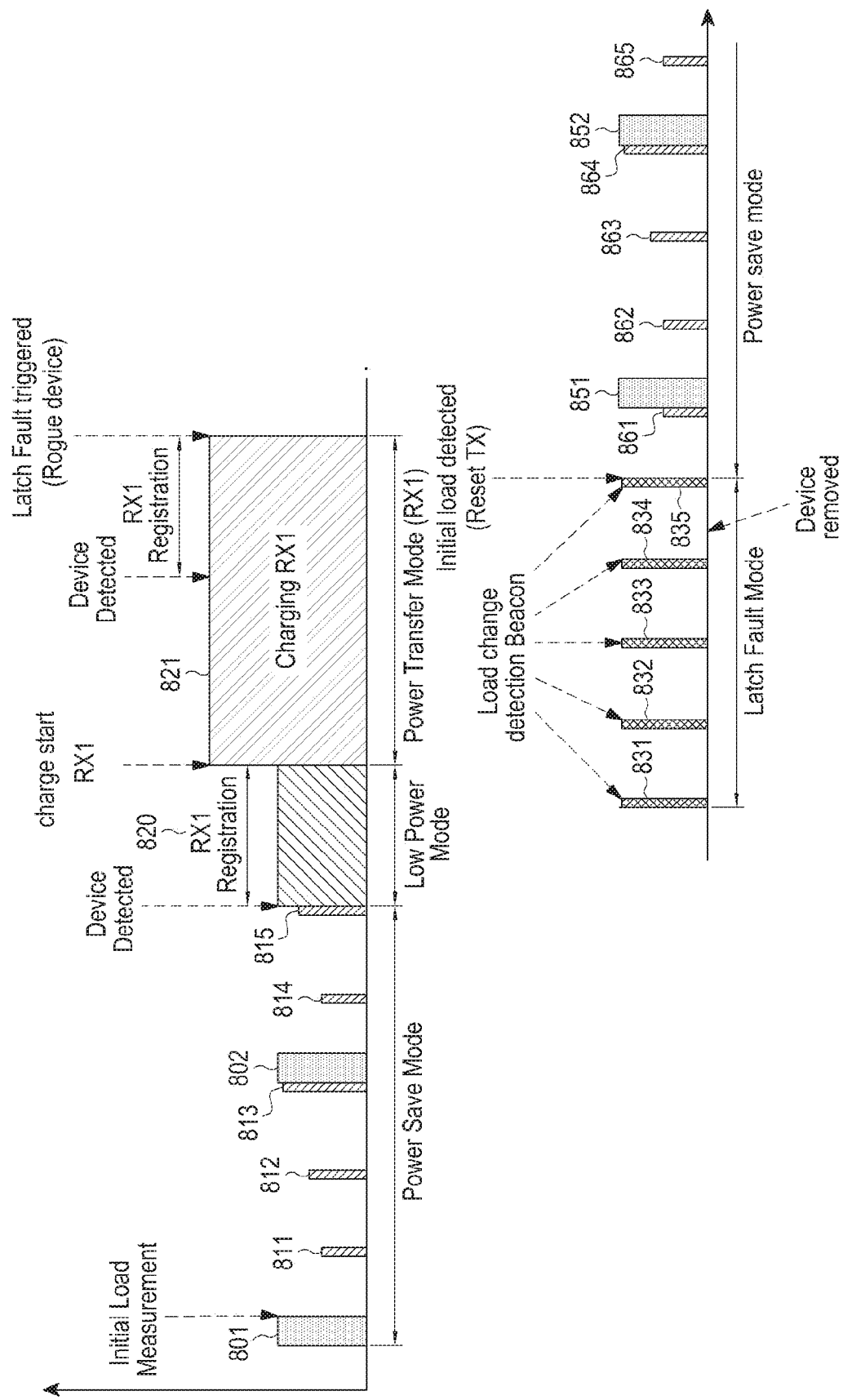
FIG. 8 is a graph on a time axis of an amount of power applied by the PTU of FIG. 7, according to an embodiment of the present disclosure.

FIG. 7 is a flowchart of a method of controlling a wireless power transmitting unit, according to an embodiment of the present disclosure. The method of FIG. 7 will be described in more detail with reference to FIG. 8. FIG. 8 is a graph on a time axis (x axis) of an amount of power applied by a PTU of FIG. 7, according to an embodiment of the present disclosure.

The PTU may initiate the method in step S701. Further, the PTU may reset an initial configuration in step S703. The PTU may enter the power saving mode again in step S705. Here, the power saving mode may be an interval where the PTU applies power having different amounts to the power transmitter. For example, the power saving mode may correspond to an interval where the PTU applies second detection power 801 and 802 and third detection power 811, 812, 813, 814, and 815 to the power transmitter in FIG. 8. Here, the PTU may periodically apply the second power 801 and 802 by second period. When the PTU applies the second power 801 and 802, the application may continue for a second term. The PTU may periodically apply the third detection power 811, 812, 813, 814, and 815 by a third period. When the PTU applies the third detection power 811, 812, 813, 814, and 815, the application may continue for a third term. Meanwhile, although it is illustrated that power values of the third detection power 811, 812, 813, 814, and 815 are different from each other, the power values of the third detection power 811, 812, 813, 814, and 815 may be different or they may be the same.

Meanwhile, the second detection power 801 and 802 may be power that can drive the PRU. More specifically, the second detection power 801 and 802 may have a power amount which can drive the controller and the communication unit of the PRU.

The PTU applies the second detection power 801 and 802 and the third detection power 811, 812, 813, 814, and 815 to the power receiver by a second period and a third period, respectively. When the PRU is disposed on the wireless power transmitting unit, impedance at a point of the PTU may be changed. For example, the PTU may detect a change in impedance while the second detection power 801 and 802 and third detection power 811, 812, 813, 814, and 815 are applied. For example, the PTU may detect the impedance change while the third detection power 815 is applied. Accordingly, the PTU may detect an object in step S707. When the object is not detected (No in step S707), the PTU may maintain the power saving mode in which different power is periodically applied in step S705.

Meanwhile, when the impedance is changed and thus the object is detected (Yes in step S707), the PTU may enter the low power mode in step S709. Here, the low power mode is a mode in which the PTU applies driving power having a power amount by which the controller and the communication unit of the PRU can be driven. For example, in FIG. 8, the PTU may apply driving power 820 to the power transmitter. The PRU may receive the driving power 820 to drive the controller and the communication unit. The PRU may perform communication with the PTU according to a predetermined scheme based on the driving power 820. For example, the PRU may transmit/receive data required for authentication, and may subscribe to the wireless power network, which the wireless power transmitter manages, on the basis of the transmission/reception of the data.

Thereafter, the PTU may enter the power transmission mode in which charging power is transmitted in step S711. For example, the PTU may apply charging power 821 and the charging power may be transmitted to the PRU as illustrated in FIG. 8.

The PTU may determine whether an error is generated in the power transmission mode. Here, the error may be caused by the rogue object on the wireless power transmitting unit, the cross-connection, over voltage, over current, over temperature, and the like. The PTU may include a sensing unit that may measure the over voltage, the over current, over temperature, and the like. For example, the PTU may measure a voltage or a current at a reference position. When the measured voltage or current is larger than a threshold, it is determined that conditions of the over voltage or the over current are satisfied. Alternatively, the PTU may include a temperature sensing means and the temperature sensing means may measure temperature at a reference position of the wireless power transmitting unit. When temperature at the reference position is larger than a threshold, the PTU may determine that a condition of the over temperature is satisfied.

Meanwhile, when an over voltage, over current, or over temperature state is determined according to a measurement value of the temperature, voltage, or current, the PTU prevents the over voltage, over current, or over temperature by reducing the wireless charging power by a preset value. At this time, when a voltage value of the reduced wireless charging power is smaller than a preset minimum value (for example, the minimum voltage value ($V_{RECT\_MIN\_DYN}$) of the back end of the rectifier of the PRU), the wireless charging is stopped, so that the voltage setting value may be re-controlled.

Although it has been illustrated that the error is generated since the rogue object is arranged on the PTU in the embodiment of FIG. 8, the error is not limited thereto and it will be easily understood by those skilled in the art that the PTU operates through a similar process with respect to the rogue object, the cross-connection, the over voltage, the over current, and the over temperature.

When the error is not generated (No in step S713), the PTU may maintain the power transmission mode in step S711. Meanwhile, when the error is generated (Yes in step S713), the PTU may enter the latch fault mode in step S715. For example, the PTU may apply first power 831 to 835 as illustrated in FIG. 8. Further, the PTU may output an error generation display including at least one of a lamp (or other visual indication) and a warning sound during the latch fault mode. When it is determined that the rogue object or PRU is not withdrawn (No in step S717), the PTU may maintain the latch fault mode in step S715. Meanwhile, when it is determined that the rogue object or PRU is withdrawn (Yes in step S717), the PTU may enter the power saving mode again in step S719. For example, the PTU may apply second power 851 and 852 and third power 861 to 865 of FIG. 8.

In the above description, the error is generated while the PTU transmits the charging power. Hereinafter, an operation of the PTU when a plurality of PRU receives charging power from the PTU will be described.

Figure 9:
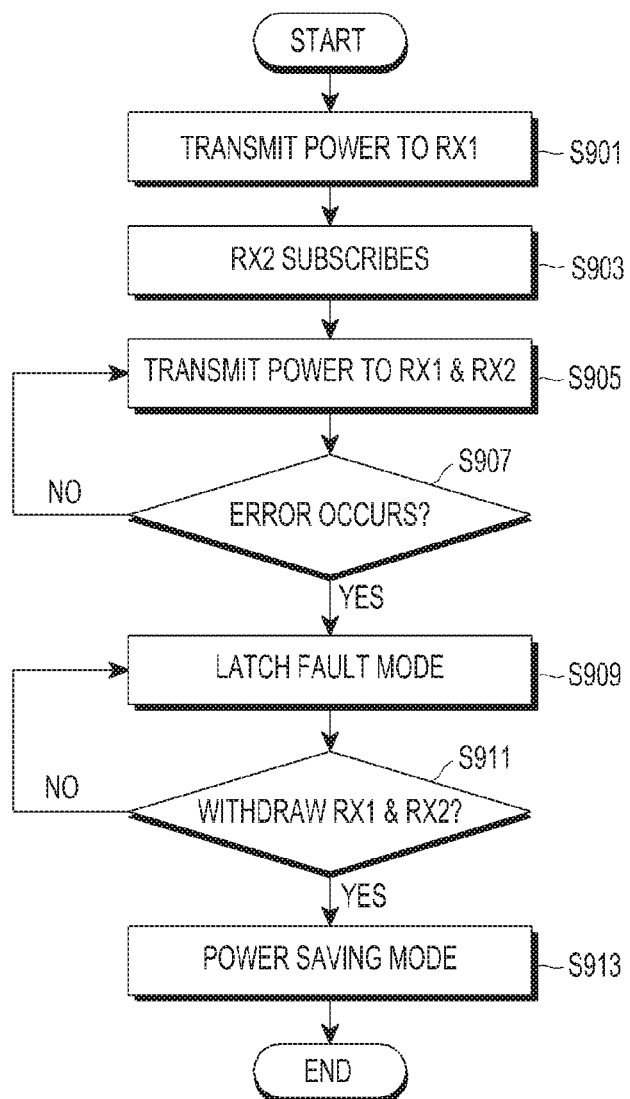
FIG. 9 is a flowchart of a control method of a wireless power transmitting unit, according to an embodiment of the present disclosure.
Figure 10:
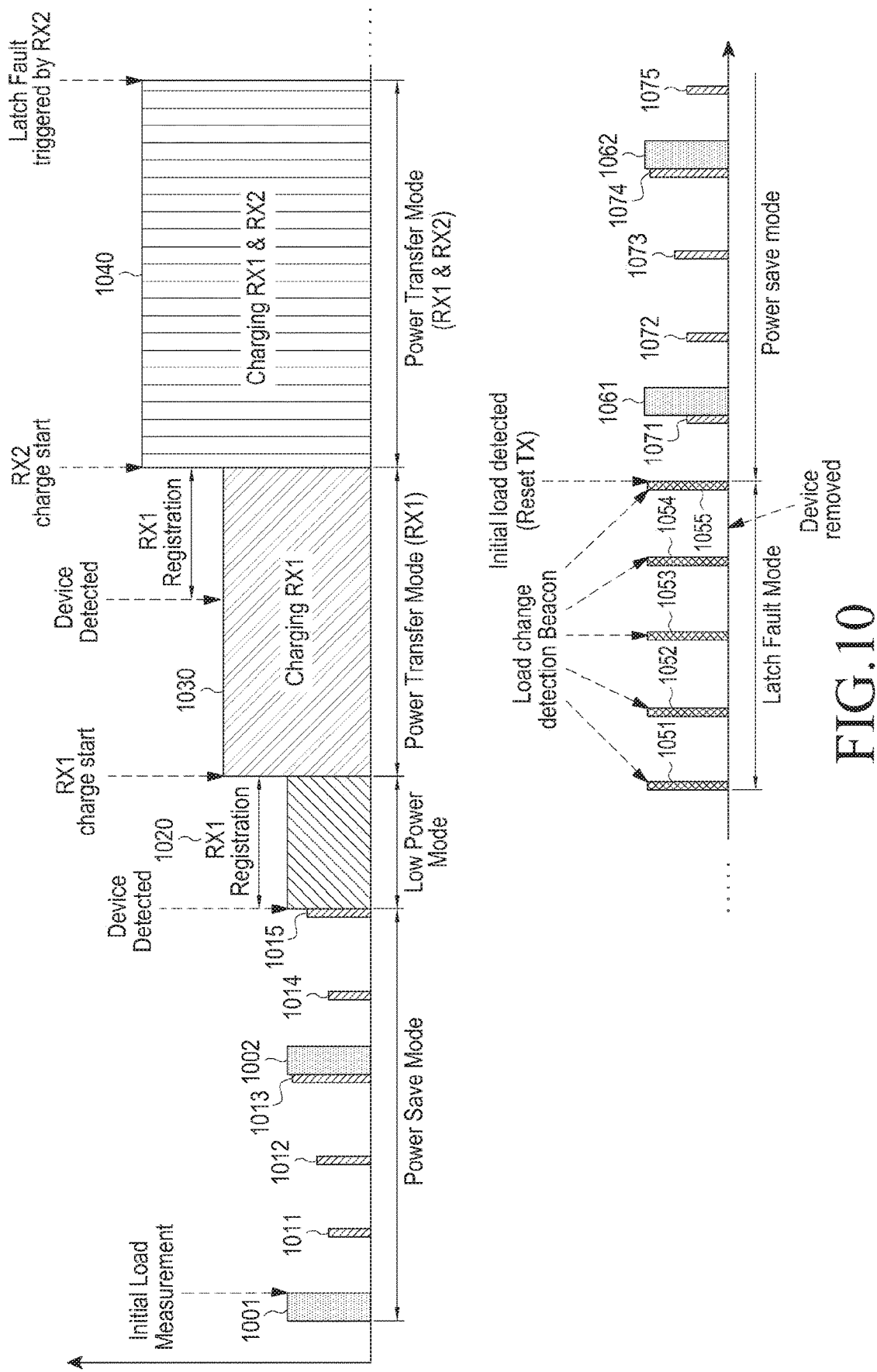
FIG. 10 is a graph on a time axis of an amount of power applied by the PTU of FIG. 9, according to an embodiment of the present disclosure.

FIG. 9 is a flowchart of a method of controlling a wireless power transmitting unit, according to an embodiment of the present disclosure. The process of FIG. 9 will be described in more detail with reference to FIG. 10. FIG. 10 is a graph on a time axis (x axis) of an amount of power applied by a PTU of FIG. 9, according to an embodiment of the present disclosure.

As illustrated in FIG. 9, the PTU may transmit charging power to a first PRU (RX1) in step S901. Further, the PTU may allow a second PRU (RX2) to additionally subscribe to the wireless power network in step S903. The PTU may transmit charging power to the second PRU in step S905. More specifically, the PTU may apply a sum of the charging power required by the first PRU and the second PRU to the power receiver.

For example, with reference to FIG. 10, the PTU may maintain the power saving mode in which second detection power 1001 and 1002 and third detection power 1011 to 1015 are applied. Thereafter, the PTU may detect the first PRU and enter the low power mode in which the detection power 1020 is maintained. Next, the PTU may enter the power transmission mode in which first charging power 1030 is applied. The PTU may detect the second PRU and allow the second PRU to subscribe to the wireless power network. Further, the PTU may apply second charging power 1040 having a power amount corresponding to a sum of power amounts required by the first PRU and the second PRU.

Referring back to FIG. 9, the PTU may detect error generation in step S907 while charging power is transmitted to both the first and second PRUs in step S905. As described above, the error may be caused by the rogue object, the cross-connection, the overvoltage, the overcurrent, the over temperature and the like. When the error is not generated (No in step S907), the PTU may maintain the applying of the second charging power 1040.

Meanwhile, when the error is generated (Yes in step S907), the PTU may enter the latch fault mode in step S909. For example, the PTU may apply the first power 1051, 1052, 1053, 1054, and 1055 of FIG. 10 by a first period. The PTU may determine whether both the first PRU and the second PRU are withdrawn in step S911. For example, the PTU may detect an impedance change while applying the first power 1051 to 1055. The PTU may determine whether both the first PRU and the second PRU are withdrawn based on whether the impedance is returned to an initial value.

When it is determined that both the first PRU and the second PRU are withdrawn (Yes in step S911), the PRU may enter the power saving mode in step S913. For example, the PTU may apply second detection power 1061 and 1062 and third detection power 1071 to 1075 by a second period and a third period, respectively.

As described above, even if the PTU applies charging power to a plurality of PRU, the PTU may determine whether the PRU or the rogue object is withdrawn when the error occurs.

Figure 11:
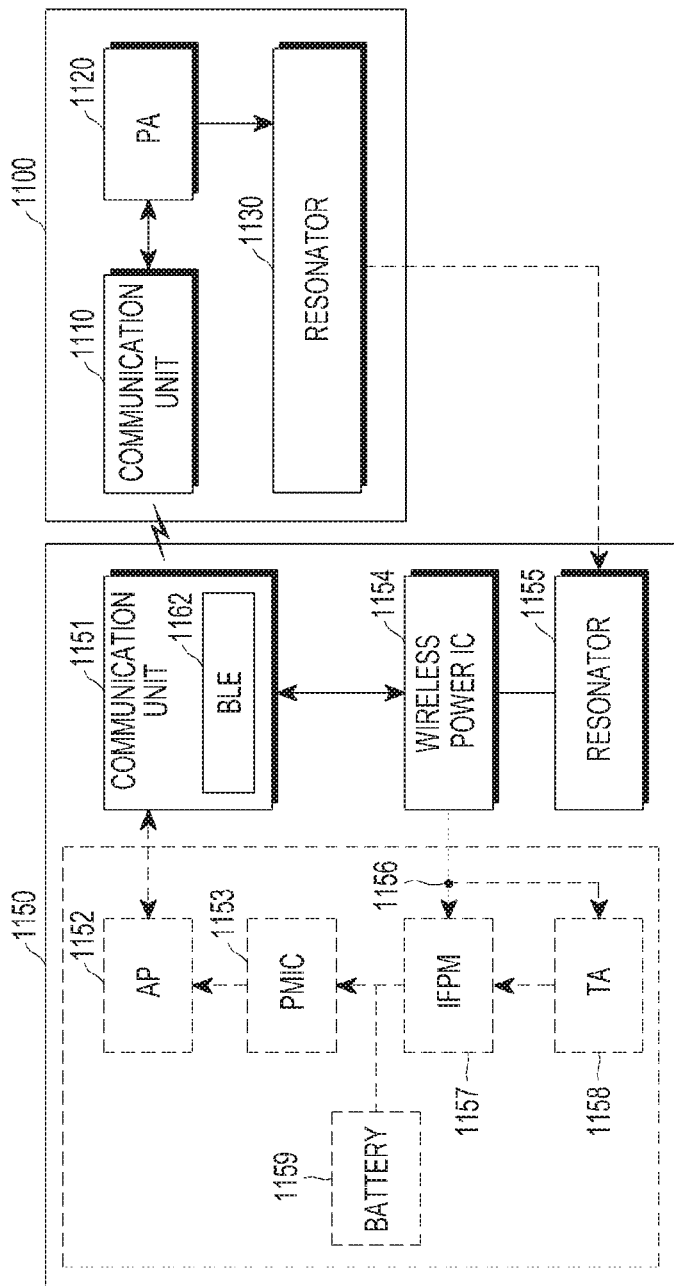
FIG. 11 is a diagram of a PTU and a PRU in a stand-alone (SA) mode, according to an embodiment of the present disclosure.

FIG. 11 is a diagram of a PTU and a PRU in a SA mode, according to an embodiment of the present disclosure.

A PTU 1100 includes a communication unit 1110, a PA 1120, and a resonator 1130. The PRU 1150 may include a communication unit 1151, an application processor (AP) 1152, a power management integrated circuit (PMIC) 1153, a wireless power integrated circuit (WPIC) 1154, a resonator 1155, an interface power management (IFPM) IC 1157, a TA 1158, and a battery 1159.

The communication unit 1110 of the PTU 1100 may be implemented by Wi-Fi/BT Combo IC and communicates with the communication unit 1151 of the PRU 1150 in a predetermined scheme, for example, a BLE scheme. For example, the communication unit 1151 of the PRU 1150 may transmit the PRU dynamic signal having the data configuration of Table 1 to the communication unit 1110 of the PTU 1100. As described above, the PRU dynamic signal may include at least one of voltage information, current information, temperature information and alert information of the PRU 1150.

A value of the power output from the power amplifier 1120 may be adjusted based on the received PRU dynamic signal. For example, when the overvoltage, the overcurrent, and the over-temperature are applied to the PRU 1150, a power value output from the power amplifier 1120 may be reduced. Further, when a voltage or current of the PRU 1150 is smaller than a preset value, a power value output from the power amplifier 1120 may be increased.

Charging power from the resonator 1130 of the PTU 1100 may be wirelessly transmitted to the resonator 1155 of the PRU 1150.

The WPIC 1154 may rectify the charging power received from the resonator 1155 and perform DC/DC conversion. The WPIC 1154 may drive the communication unit 1151 or charge the battery 1159 by using the converted power.

Meanwhile, a wired charging terminal may be inserted into the TA 1158. The TA 1158 may have the wired charging terminal such as a 30 pin connector or USB connector, and may receive the power supplied from an external power source to charge the battery 1159.

The IFPM 1157 may process power applied from the wired charging terminal and output the processed power to the battery 1159 and the PMIC 1153.

The PMIC 1153 may manage wirelessly received power, power received through a wire, and power applied to each of the components of the PRU 1150. The AP 1152 may receive information on the power from the PMIC 1153, and may control the communication unit 1151 to transmit the PRU dynamic signal of reporting the power information.

The TA 1158 may be connected to a node 1156 connected to the WPIC 1154. When the wired charging connector is inserted into the travel adapter 1158, a predetermined voltage (e.g., a voltage of 5V) may be applied to the node 1156. The WPIC 1154 may monitor the voltage applied to the node 1156 to determine whether the travel adapter is inserted.

The AP 1152 has a stack in a predetermined communication scheme, for example, a Wi-Fi/BT/BLE stack. Accordingly, in communication for the wireless charging, the communication unit 1151 may load the stack from the AP 1152 and may then communicate with the communication unit 1110 of the PTU 1100 by using a BT or BLE communication scheme based on the stack.

However, a state may occur in which data for performing wireless power transmission cannot be fetched from the AP 1152, e.g., the AP 1152 is turned off or in which power is lost so that the AP 1152 cannot remain in an on state while the data is being fetched from a memory within the AP 1152.

When a residual capacity of the battery 1159 is less than a minimum power threshold, the AP 1152 is turned off, and the wireless charging can be performed using some components for the wireless charging, disposed within the PRU, for example, the communication unit 1151, the WPIC 1154, and the resonator 1155. A state where the AP 1152 cannot be turned on may be referred to as a dead battery state.

Since the AP 1152 is not driven in the dead battery state, the communication unit 1151 cannot receive a stack in a predetermined communication scheme, for example, a Wi-Fi/BT/BLE stack from the AP 1152. For such a case, some of the stacks in the predetermined communication scheme, for example, the BLE stack, are fetched within the memory 1162 of the communication unit 1151 from the AP 1152 and stored in the memory 1162. Accordingly, the communication unit 1151 may communicate with the PTU 1100 for the wireless charging by using the stack in the communication scheme stored in the memory 1162, that is, a wireless charging protocol. At this time, the communication unit 1151 may include a memory, and the BLE stack may be stored in a memory in a form of a read only memory (ROM) in the SA mode.

As described above, a mode in which the communication unit 1151 performs the communication by using the stack of the communication scheme stored in the memory 1162 may be the SA mode. Accordingly, the communication unit 1151 manages a charging process based on the BLE stack.

The concept of the wireless charging system which can be applied to the present disclosure has been described with reference to FIGS. 1 to 11. Hereinafter, with reference to FIGS. 12 to 15, a method for transmitting wireless power in a wireless charging system, a wireless power transmitting unit, and a PRU, according to an embodiment of the present disclosure will now be described.

The following methods can be used for determining a reference PRU (hereinafter a dominant PRU) in transmitting, by one wireless power transmitting unit, charging power to a plurality of PRUs.

For example, when transmitting the charging power to one PRU by one wireless power transmitting unit, an optimum charging state for the corresponding PRU can be maintained by power tracking of $V_{RECT\_MIN\_ERROR}$. However, when simultaneously charging a plurality of PRUs by one wireless power transmitting unit, the charging power can be efficiently controlled by setting or determining the dominant PRU.

As a method for determining the dominant PRU, a highest percentage utilization method is described. The method provides a relatively efficient way of transmitting power from a wireless transmitting unit to a wireless receiving unit. However, the method may not efficiently operate for a plurality of PRUs having different temperature settings or dissipation. For example, the dominant PRU determined by the method may not be an optimum dominant PRU, and the temperature of another PRU may increase above a threshold temperature while the dominant PRU is being charged.

For example, the temperature of the PRU may be an important factor in determining the dominant PRU. Accordingly, a dominant PRU may be set or determined by considering the temperature of the PRU.

In addition, a difference of coupling efficiency of the resonator may generate a difference of $V_{RECT}$ in each PRU. Some PRUs may have high efficiency and have a large margin because $V_{RECT}$ is lower than $V_{RECT\_HIGH}$, and $V_{RECT}$ of any PRU may not have a margin. Since $V_{RECT}$ may vary in a combination of a PRU and a wireless power transmitting unit, $V_{RECT}$ and $V_{RECT\_HIGH}$ margin may be one of the major factors in determining the dominant PRU.

As a method for controlling wireless charging power, $V_{RECT\_MIN\_ERROR}$ is proposed for adjusting the output power of the PTU such that $V_{RECT}$, which is registered as a current dynamic parameter, approaches $V_{RECT\_SET\_STATIC}$ value received through a static parameter or $V_{RECT\_SET\_DYNAMIC}$ value received through a dynamic parameter, from the PRU.

Meanwhile, in a multi-charging case where the PTU charges two or more PRUs at the same time, one of the plurality of PRUs may be determined as the dominant PRU, and transmission power or Itx may be adjusted such that the current associated with $V_{RECT}$ of the determined dominant PRU approaches a $V_{RECT\_SET}$ value. That is, $E_{VRECT} = |V_{RECT} - V_{RECT\_SET}|$ can be adjusted to be minimal.

Among methods for setting a dominant PRU, there is a method for determining a PRU having the highest utilization rate (for example, a PRU having the maximum $P_{RECT}/P_{RECT\_MAX}$) as a dominant PRU.

Here, $V_{RECT\_SET}$ may be set as the most appropriate voltage for the operation or charging of the PRU, and when there is a PRU which is not determined as the dominant PRU, or $V_{RECT}$ becomes too high, a heating problem may occur according to a coupling position or a matching state.

Hereinafter, a method for determining a dominant PRU according to various embodiments of the present disclosure will be described.

A PRU having the highest heat generation rate may be determined as a dominant PRU, from among a plurality of PRUs that receive charging power from a wireless power transmitting unit.

For example, information on the available maximum temperature ($T_{MAX}$) of the PRU may be transmitted to the PTU through a PRU static signal transmitted from the PRU. In addition, information on the temperature of the current PRU may be transmitted to the PTU through a PRU operation signal transmitted from the PRU.

The PTU may calculate a heat generation rate, using information on the available maximum temperature and information on the current temperature received from the PRU. The heat generation rate (T ratio) can be calculated using Equation 1 as follows.

$$T \text{ ratio} = \frac{\text{current temperature of } PRU}{T\max \text{ of } PRU} \qquad (1)$$

For example, since OTP is most likely to occur in a PRU which has the smallest current temperature state ratio of the wireless charging receiving unit, a wireless charging receiving unit having the smallest heat generation rate may be determined as the dominant PRU.

In determining the dominant PRU, when a PRU having the highest heat generation rate becomes the dominant PRU and the PTU matches the level of transmission power to the standard of the dominant PRU, the PRU closes the optimum $V_{RECT}$ to reduce the heat generation. Accordingly, since a PRU having the highest heat generation rate is determined as the dominant PRU, the heat generation can be more efficiently managed.

Figure 12:
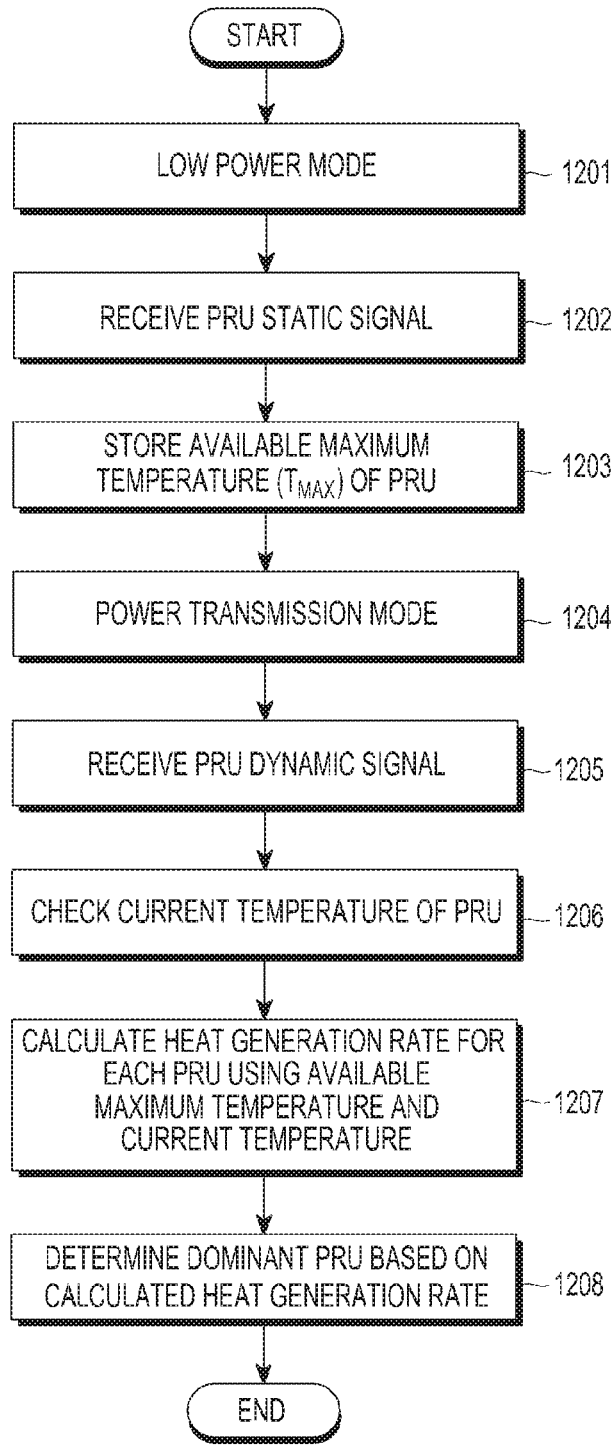
FIG. 12 is a flowchart of a processing method of a wireless power transmitting unit, according to an embodiment of the present disclosure.

FIG. 12 is a flowchart a processing method of a wireless power transmitting unit, according to an embodiment of the present disclosure. Referring to FIG. 12, a PTUPTU may receive the PRU static signal at step 1202 from the PRU, which is set to operate in the low-power mode at step 1201. The PRU static signal may include the available maximum temperature ($T_{MAX}$) of the corresponding PRU as shown in Table 5.

example, the PRU having the highest calculated heat generation rate can be determined as the dominant PRU). As described above, the heat generation can be more efficiently managed by switching the dominant PRU to a power wireless receiving unit having the highest heat generation rate. The PTU may adjust transmission power or Itx such that $V_{RECT}$ of the determined dominant PRU closes to $V_{RECT\_SET}$.

Figure 13:
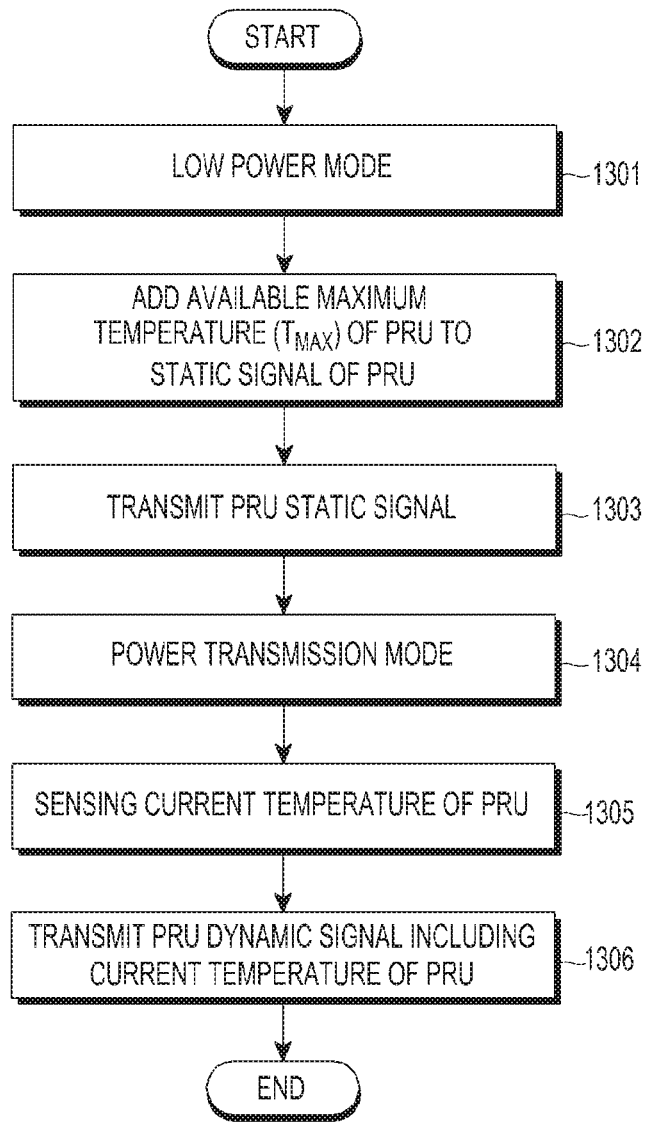
FIG. 13 is a flowchart of a processing method of a PRU, according to an embodiment of the present disclosure.

FIG. 13 is a flowchart of a processing method of a PRU, according to an embodiment of the present disclosure. Referring to FIG. 13, the PRU is set to operate in the

TABLE 5

| Field | Octets | Description | Use | Units |
|---|---|---|---|---|
| Optional fields validity | 1 | Defines which optional fields are populated | Mandatory | |
| Protocol Revision | 1 | A4WP Supported Revision | Mandatory | |
| RFU | 1 | Undefined | N/A | |
| PRU Category | 1 | Category of PRU | Mandatory | |
| PRU Information | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| $P_{RECT\_MAX}$ | 1 | $P_{RECT\_MAX}$ of PRU | Mandatory | mW × 100 |
| $V_{RECT\_MIN\_STATIC}$ | 2 | $V_{RECT\_MIN}$ (static, first estimate) | Mandatory | mV |
| $V_{RECT\_HIGH\_STATIC}$ | 2 | $V_{RECT\_HIGH}$ (static, first estimate) | Mandatory | mV |
| $V_{RECT\_SET}$ | 2 | $V_{RECT\_SET}$ | Mandatory | mV |
| Delta R1 value | 2 | Delta R1 caused by PRU | Optional | 0.01 ohms |
| Tmax | 1 | Maximum temperature of PRU | Mandatory | Degrees Celsius (from −40° C.) |
| RFU | 4 | Undefined | N/A | |

The PTU that has received the available maximum temperature from the PRU may store the available maximum temperature of each PRU at step 1203.

The PTU, enters the power transmission mode at step 1204, PTU and receives a PRU dynamic signal from each of the plurality of PRUs being charged at step 1205. The PRU dynamic signal received from each PRU may include information on the current temperature of the corresponding PRU, as shown in Table 6.

low-power mode at step 1301, and an available maximum temperature ($T_{MAX}$) of the PRU is added to a PRU static signal at step 1302. The PRU static signal to which the available maximum temperature is added is transmitted to the PTU at step 1303).

With the PRU in the power transmission mode at step 1304, in which the PRU is being charged, the PRU may sense the current temperature by the temperature sensor and

TABLE 6

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier | Mandatory | mV |
| $I_{RECT}$ | 2 | DC current at the output of the rectifier | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Mandatory | Degrees Celsius (from −40° C.) |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester Command | 1 | PTU Test Mode Command | Optional | Bit field |
| RFU | 2 | Undefined | | |

The PTU may calculate the heat generation rate for each PRU based on the received available maximum temperature and the current temperature at step 1207. The heat generation rate can be calculated using Equation 1 described above.

Next, the PTU may determine the dominant PRU based on the calculated heat generation rate, at step 1208. For the like at step 1305. The sensed current temperature may be included in the PRU dynamic signal and then transmitted to the PTU at step 1306.

When not informing the PTU by separately adding the maximum value of the PRU temperature and the current temperature to the PRU dynamic signal or PRU static signal as described above, the PRU may calculate the heat generation rate and inform the same to the PTU. For example, the PRU may calculate a heat generation rate (Tratio) from the maximum value ($T_{MAX}$) of the PRU temperature and the measured current temperature, using the above-described Equation 1, and transmit the calculated ratio to the PTU. The heat generation rate (Tratio) may be added to the PRU dynamic signal and then transmitted, as shown in Table 7.

The $V_{RECT\_HIGH}$ is a voltage value measured at a back end of the rectifier, and refers to a maximum voltage value when operating within the optimum voltage range and may also be set to the $V_{RECT\_HIGH\_STATIC}$ included in the PRU static signal transmitted from the PRU, and it may be set to the $V_{RECT\_HIGH\_DYN}$ included in the PRU operation signal transmitted from the PRU.

TABLE 7

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier | Mandatory | mV |
| $I_{RECT}$ | 2 | DC current at the output of the rectifier | Mandatory | mA |
| $V_{OUT}$ | 2 | Voltage at charge/battery port | Optional | mV |
| $I_{OUT}$ | 2 | Current at charge/battery port | Optional | mA |
| Tratio | 1 | Temperature ratio of PRU (Tcurrent_temp/Totp_threshold) | Optional | Bit field |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester Command | 1 | PTU Test Mode Command | Optional | Bit field |
| RFU | 2 | Undefined | | |

In Table 7, Tratio may be defined by a ratio of temperature of Tcurrent_temp/Totp_threshold, the Tcurrent temp refers to a currently measured temperature, and the Totp_threshold refers to over-temperature protection threshold of PRU.

A PRU having the highest $V_{RECT}$ ratio may be determined as the dominant PRU.

A PRU having the smallest ratio between $V_{RECT\_HIGH\_STATIC}$ of the corresponding PRU included in the PRU static signal or $V_{RECT\_HIGH\_DYN}$ of the corresponding PRU included in the PRU dynamic signal, which are transmitted from the PRU, and $V_{RECT}$ of the current PRU has the highest possibility to generate heat or exceed $V_{HIGH}$. Therefore, the PRU satisfying the above condition may be determined as the dominant PRU.

For example, the ratio of a voltage at a rectifier stage of the PRU may be calculated using Equation 2 as follows.

$$V \text{ ratio } (V_{RECT} \text{ ratio}) = \frac{V_{RECT}}{V_{RECT\_HIGH}} \quad (2)$$

A PRU having the highest voltage ratio may be determined as the dominant PRU, among a plurality of the PRUs.

Thus, when the PRU having a high difference ratio of the $V_{RECT}$ is set as a dominant PRU and then a transmission power level of the PTU is adjusted, the determined dominant PRU may close the optimum $V_{RECT}$ to reduce the heat generation, and since it is not likely to exceed the $V_{RECT\_HIGH}$, a charging operation of the optimum range can be provided.

Figure 14:
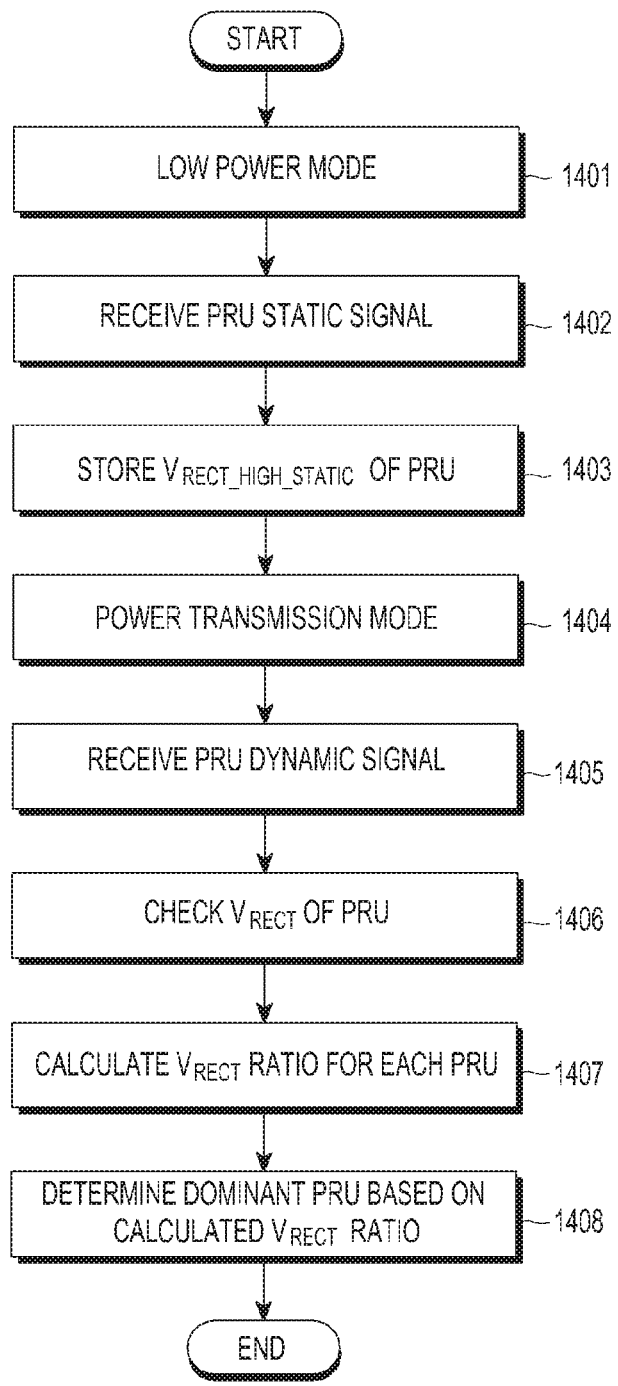
FIG. 14 is a flowchart of a processing method of a wireless power transmitting unit, according to an embodiment of the present disclosure.

FIG. 14 is a flowchart illustrating a processing procedure of a PTU, according to an embodiment of the present disclosure. Referring to FIG. 14, a PTU, which is set to operate in a low-power mode at step 1401, may receive the PRU static signal from the PRU at step 1402. The PRU static signal may include maximum voltage value ($V_{RECT\_HIGH\_STATIC}$) information of a back end of the rectifier of the corresponding PRU as shown in Table 8 below.

TABLE 8

| Field | Octets | Description | Use | Units |
|---|---|---|---|---|
| Optional fields validity | 1 | Defines which optional fields are populated | Mandatory | |
| Protocol Revision | 1 | A4WP Supported Revision | Mandatory | |
| RFU | 1 | Undefined | N/A | |
| PRU Category | 1 | Category of PRU | Mandatory | |
| PRU Information | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| $P_{RECT\_MAX}$ | 1 | $P_{RECT\_MAX}$ of PRU | Mandatory | mW × 100 |
| $V_{RECT\_MIN\_STATIC}$ | 2 | $V_{RECT\_MIN}$ (static, first estimate) | Mandatory | mV |
| $V_{RECT\_HIGH\_STATIC}$ | 2 | $V_{RECT\_HIGH}$ (static, first estimate) | Mandatory | mV |
| $V_{RECT\_SET}$ | 2 | $V_{RECT\_SET}$ | Mandatory | mV |
| Delta R1 value | 2 | Delta R1 caused by PRU | Optional | 0.01 ohms |

TABLE 8-continued

| Field | Octets | Description | Use | Units |
|---|---|---|---|---|
| Tmax | 1 | Maximum temperature of PRU | Mandatory | Degrees Celsius (from −40° C.) |
| RFU | 4 | Undefined | N/A | |

As described above, the PTU that has received the maximum voltage value information from the PRU may store the maximum voltage value information of each PRU at step 1403.

With the PTU set in a power transmission mode at step 1404, the PTU may receive the PRU dynamic signal from each of the plurality of PRUs being charged at step 1405. The PRU dynamic signal received from each PRU may include voltage ($V_{RECT}$) information of a back end of the rectifier of the corresponding PRU, as shown in Table 9.

TABLE 9

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier | Mandatory | mV |
| $I_{RECT}$ | 2 | DC current at the output of the rectifier | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Mandatory | Degrees Celsius (from −40° C.) |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester Command | 1 | PTU Test Mode Command | Optional | Bit field |
| RFU | 2 | Undefined | | |

The PTU may check the received maximum voltage value information and current voltage information at step 1406 and calculate a voltage ratio for each PRU, based on the checked information at step 1407. The voltage ratio may be calculated using Equation 2.

Next, the PTU may determine the dominant PRU based on the calculated voltage ratio at step 1408. For example, the PRU having the highest calculated voltage ratio may be determined as the dominant PRU.

As described above, when the PRU having the highest voltage ratio is set as the dominant PRU and then a transmission power level of the PTU is adjusted, the dominant PRU may close the optimum $V_{RECT}$ to reduce the heat generation. The PTU may adjust the transmission power or Itx such that $V_{RECT}$ of the determined PRU closes to $V_{RECT\_SET}$.

Figure 15:
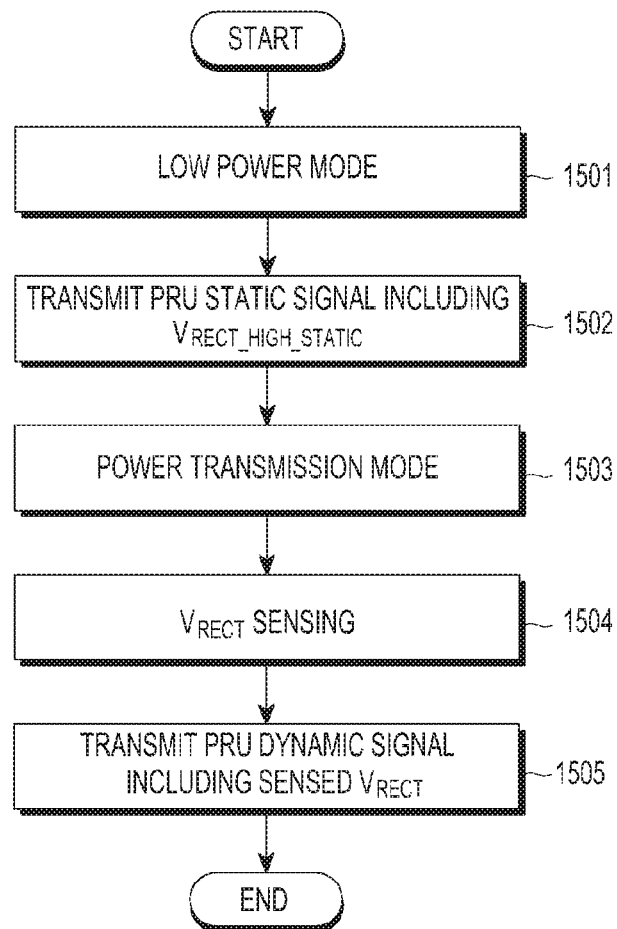
FIG. 15 is a flowchart of a processing method of a PRU, according to an embodiment of the present disclosure.

FIG. 15 is a flowchart of a processing method of a PRU, according to an embodiment of the present disclosure. Referring to FIG. 15, with the PRU operating in the low-power mode at step 1501, maximum voltage value ($V_{RECT\_HIGH\_STATIC}$) information of a back end of a rectifier of the PRU may be added to the PRU static signal and then the PRU static signal may be transmitted at step 1502.

In the power transmission mode at step 1503, in which the PRU is being charged, the PRU may sense the $V_{RECT}$ at step 1504. The sensed $V_{RECT}$ information may be included in the PRU dynamic signal and then transmitted to the PTU at step 1505.

In determining the dominant PRU as described above, it is important to guarantee the predictability of PTU operation. In addition, it is important to guarantee that the dominant PRU is not continuously changed by a result selection mechanism due to a different selection criteria that is applied each time new information is provided to the PTU by the dynamic signal (for example, PRU dynamic signal).

For example, as the worst case, the dominant PRU may be changed at every 250 ms. Accordingly, in order to solve such a problem, various algorithms to be described below may also be considered.

When the PTU is paired with the plurality of the PRUs, the dominant PRU can be selected as a main PRU, by the PTU, for the optimum closed-loop power control algorithm.

The PTU may select any one of a $V_{RECT\_MIN\_ERROR}$ algorithm or a $\eta_{MAX}$ algorithm, as described above. In addition, the PTU may switch two algorithms and then apply the switched algorithms. However, the PTU is not configured to adjust $I_{TX\_COIL}$ so that any PRU do not deviate beyond an optimal voltage area. Taking this into account, a preferred algorithm for the dominant PRU can be selected by considering whether OVP (Over Voltage Protection) indication or $V_{RECT}$ that is reported by the PRU is greater than $V_{RECT\_HIGH}$ or less than $V_{RECT\_MIN}$.

For example, when a PTU is paired with one PRU, the PTU may adjust $E_{VRECT}=|V_{RECT}-V_{RECT\_SET}|$ to be minimal. If the PTU is paired with the plurality of PRUs, the PTU may adjust $I_{TX\_COIL}$ to minimize $E_{VRECT}$ for the dominant PRU.

Hereinafter, various embodiments in which a PTU selects a dominant PRU when the PTU is to be paired with the plurality of the PRUs will be described. The PTU may change (switch) the dominant PRU selection mechanism, it may prove advantageous not to use a plurality of mechanisms at the same time. When the PTU switches a mechanism for selecting the dominant PRU, the selected mechanism can be continued for a predetermined time (e.g., 5 seconds) by considering an exceptional situation which will be described below.

If the PTU selects a dominant PRU by using an algorithm that is different from the current maximum Tratio algorithm, and detects a PRU satisfying a Tratio>Temp threshold condition before a predetermined time (e.g., 5 seconds) interval is elapsed from last switching to a new dominant PRU selection mechanism, the PTU may immediately switch to a Tratio mechanism for selecting the dominant PRU after detecting the condition.

Hereinafter, examples of various mechanisms for selecting the dominant PRU will be described.

When the PTU selects the highest percentage utilization mechanism for the selection of the dominant PRU, the PTU may select the dominant PRU having the highest percentage utilization compared to a rated output. The ratio of the rated output may be represented by Equation 3 as follows.

$$P \text{ ratio } (P_{RECT} \text{ ratio}) = \frac{P_{RECT}}{P_{RECT\_MAX}} \quad (3)$$

In Equation 3, $P_{RECT\_MAX}$ refers to the maximum output power of the PRU design. The $P_{RECT\_MAX}$ may be transmitted to the PTU by the PRU static signal.

When the PTU selects the maximum temperature ratio (Tratio) mechanism for the selection of the dominant PRU, the PTU may select a PRU having the maximum Tratio as the dominant PRU. The Tratio may be calculated by dividing Tcurrent reported as the PRU dynamic signal into Topt reported as the PRU static signal. When the Tratio of the PRU exceeds a predetermined threshold ($T_{threshold}$), the PRU may switch the dominant PRU to another PRU. The PTU may use the predetermined threshold ($T_{threshold}$) greater than or equal to 0.75.

When the PTU selects a maximum $V_{RECT\_HIGH}$ ratio algorithm for the selection of the dominant PRU, the PTU may select a PRU having the highest $V_{RECT\_HIGH\_RATIO}$ as the dominant PRU. The $V_{RECT\_HIGH}$ ratio may be calculated by dividing $V_{RECT}$ that is reported as the PRU dynamic signal into $V_{RECT\_HIGH\_STATIC}$ or $V_{RECT\_HIGH\_DYN}$.

When the $V_{RECT\_HIGH\_DYN}$ is reported to the PTU, the $V_{RECT\_HIGH\_DYN}$ may be used instead of $V_{RECT\_HIGH\_STATIC}$. When the $V_{RECT\_HIGH}$ ratio exceeds a threshold of $V_{RECT\_HIGH}$, the PTU may switch the dominant PRU to another PRU. The PTU may use the threshold of $V_{RECT\_HIGH}$ greater than or equal to 0.75

When the PTU selects the maximum $V_{RECT\_MIN}$ ratio algorithm for the selection of the dominant PRU, the PTU may select a PRU having the highest $V_{RECT\_MIN\_RATIO}$ as the dominant PRU. The $V_{RECT\_MIN\_RATIO}$ may be calculated by dividing $V_{RECT\_MIN\_STATIC}$ or $V_{RECT\_MIN\_DYN}$ into $V_{RECT}$ that is reported as the PRU dynamic signal.

When the $V_{RECT\_MIN\_DYN}$ is reported to the PTU, the $V_{RECT\_MIN\_DYN}$ may be used instead of $V_{RECT\_MIN\_STATIC}$. When the $V_{RECT\_MIN}$ ratio exceeds a threshold of $V_{RECT\_MIN}$, the PTU may switch the dominant PRU to another PRU. The PTU may use the threshold of $V_{RECT\_MIN}$ greater than or equal to 0.75.

In order to implement the algorithm described above, the PRU static signal may be configured as Table 10 below.

TABLE 10

| Field | Octets | Description | Use | Units |
|---|---|---|---|---|
| Optional fields validity | 1 | Defines which optional fields are populated | Mandatory | |
| Protocol Revision | 1 | A4WP Supported Revision | Mandatory | |
| RFU | 1 | Undefined | N/A | |
| PRU Category | 1 | Category of PRU | Mandatory | |
| PRU Information | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| $P_{RECT\_MAX}$ | 1 | $P_{RECT\_MAX}$ of PRU | Mandatory | mW × 100 |
| $V_{RECT\_MIN\_STATIC}$ | 2 | $V_{RECT\_MIN}$ (static, first estimate) | Mandatory | mV |
| $V_{RECT\_HIGH\_STATIC}$ | 2 | $V_{RECT\_HIGH}$ (static, first estimate) | Mandatory | mV |
| $V_{RECT\_SET}$ | 2 | $V_{RECT\_SET}$ | Mandatory | mV |
| Delta R1 value | 2 | Delta R1 caused by PRU | Optional | 0.01 ohms |
| Totp | 1 | Temperature threshold value for over temperature protection | Mandatory | Bit field |
| RFU | 3 | Undefined | N/A | |

In Table 10, Totp may be an OTP threshold temperature and be configured as shown in Table 11 below.

TABLE 11

| Bit field | Temperature ° C. |
|---|---|
| 0-255 | −40 to +215 |

In addition, in order to implement the algorithm described above, the PRU dynamic signal may be configured as Table 12 below.

TABLE 12

| Field | Octets | Description | Use | Units |
|---|---|---|---|---|
| Optional fields validity | 1 | Defines which optional fields are populated | Mandatory | |

TABLE 12-continued

| Field | Octets | Description | Use | Units |
|---|---|---|---|---|
| $V_{RECT}$ | 2 | DC voltage at the output of the rectifier | Mandatory | mV |
| $I_{RECT}$ | 2 | DC current at the output of the rectifier | Mandatory | mA |
| $V_{OUT}$ | 2 | Voltage at charge/battery port | Optional | mV |
| $I_{OUT}$ | 2 | Current at charge/battery port | Optional | mA |
| Tcurrent | 1 | Temperature of PRU | Optional | Bit field |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester Command | 1 | PTU Test Mode Command | Optional | Bit field |
| RFU | 2 | Undefined | | |

In Table 12, Tcurrent may be a current temperature measured at the PRU and be configured as shown in Table 13 below.

TABLE 13

| Bit field | Temperature ° C. |
|---|---|
| 0-255 | −40 to +215 |

The present disclosure provides a method and apparatus that can efficiently control wireless charging power for the plurality of PRUs by applying at least one algorithm of the above-described algorithm.

For example, a $V_{RECT}$ of a PRU may be prevented from being over-voltage condition (e.g., $V_{RECT} > V_{RECT\_MAX}$). In addition, $V_{RECT}$ of the PRU can be reduced to become a state of $V_{RECT} \leq V_{RECT\_HIGH}$ within a predetermined time (e.g., 5 seconds) after reporting a state of $V_{RECT} > V_{RECT\_HIGH}$ by the PRU. In addition, if the above conditions are satisfied, it can be guaranteed that $V_{RECT}$ voltage for all PRUs is greater than $V_{RECT\_MIN}$ and smaller than $V_{RECT\_HIGH}$. In addition, if the above conditions are satisfied, $I_{TX\_COIL}$ can be controlled to optimize the $V_{RECT}$ of PRU or to maximize the efficiency of a total system.

While the present disclosure has been shown and described with reference to certain embodiments thereof, it should be understood by those skilled in the art that many variations and modifications of the method and apparatus described herein will still fall within the spirit and scope of the present disclosure as defined in the appended claims and their equivalents.

What is claimed is:

1. A method of controlling a wireless power transmitter, the method comprising:
   receiving first information related to a maximum voltage from each of the plurality of power receiving units (PRUs);
   transmitting a first level of power for charging the plurality of PRUs;
   receiving second information related to a measured voltage in each of the plurality of PRUs;
   identifying a voltage ratio of each of the plurality of PRUs based on the first information and the second information, wherein the voltage ratio is a measured voltage relative to a maximum voltage of each of the plurality of PRUs;
   selecting a PRU from among the plurality of PRUs based on the identified voltage ratio; and
   transmitting a second level of power for charging according to a voltage setting value of the selected PRU.

2. The method of claim 1, wherein the selected PRU is regarded as a dominant PRU.

3. The method of claim 1, wherein the maximum voltage is set by each of the plurality of PRUs.

4. The method of claim 1, wherein the first information related to the maximum voltage is received through a PRU static signal or a PRU dynamic signal that is transmitted by the PRU.

5. The method of claim 1, wherein the selected PRU is a PRU has the highest voltage ratio among the plurality of the PRUs.

6. The method of claim 1, wherein the second information related to the measured voltage is received through a PRU dynamic signal that is transmitted by the PRU in a low power mode.

7. The method of claim 1, wherein the second information related to the measured voltage is received through a PRU dynamic signal that is transmitted by the PRU in a power transmission mode.

8. A wireless power transmitting unit (PTU), comprising:
   communication circuitry;
   a power transmitter; and
   a processor configured to:
      receive first information related to a maximum voltage from each of a plurality of power receiving units (PRUs) through the communication circuitry;
      control the power transmitter to transmit a first level of power for charging the plurality of (PRUs);
      receive second information related to a measured voltage in each of the plurality of PRUs through the communication circuitry;
      identify a voltage ratio of each of the plurality of PRUs based on the first information and the second information;
      select a PRU from among the plurality of PRUs based on the identified voltage ratio, wherein the voltage ratio is a measured voltage relative to a maximum voltage of each of the plurality of PRUs; and
      transmit a second level of power for charging the plurality of PRUs based on a voltage setting value of the selected PRU.

9. The PTU of claim 8, wherein the selected PRU is regarded as a dominant PRU.

10. The PTU of claim 8, wherein the maximum voltage is set by each of the plurality of PRUs.

11. The PTU of claim 8, wherein the first information related to the maximum voltage is received through a PRU static signal or a PRU dynamic signal that is transmitted by the PRU.

12. The PTU of claim 8, wherein the selected PRU is a PRU has the highest voltage ratio among the plurality of the PRUs.

13. The PTU of claim 8, wherein the second information related to the measured voltage is received through a PRU dynamic signal that is transmitted by the PRU in a low power mode.

14. The PTU of claim 8, wherein the second information related to the measured voltage is received through a PRU dynamic signal that is transmitted by the PRU in a power transmission mode.

* * * * *